United States Patent [19]
Murray et al.

[11] Patent Number: 6,011,699
[45] Date of Patent: Jan. 4, 2000

[54] ELECTRONIC DEVICE INCLUDING APPARATUS AND METHOD FOR ROUTING FLEXIBLE CIRCUIT CONDUCTORS

[75] Inventors: Michael P. Murray, Chicago; Steven C. Emmert, Crystal Lake, both of Ill.

[73] Assignee: Motorola, Inc., Schaumburg, Ill.

[21] Appl. No.: 08/950,990

[22] Filed: Oct. 15, 1997

[51] Int. Cl.⁷ .................................................. H01B 1/03
[52] U.S. Cl. ........................ 361/814; 455/575; 379/433; D14/138
[58] Field of Search .................................... 361/814, 807; 455/90, 572, 573, FOR 121; 379/433; D13/103; D14/138

[56] References Cited

U.S. PATENT DOCUMENTS

| | | |
|---|---|---|
| 3,857,676 | 12/1974 | Schwab et al. . |
| 3,999,826 | 12/1976 | Yurtin ........................................ 339/17 |
| 4,255,640 | 3/1981 | Bressler ................................ 219/10.55 |
| 4,471,493 | 9/1984 | Schober .................................... 455/90 |
| 4,802,605 | 2/1989 | Salmon et al. ........................... 220/338 |
| 4,825,395 | 4/1989 | Kinser, Jr. et al. ...................... 364/708 |
| 4,842,531 | 6/1989 | Takemura ................................. 439/165 |
| 4,845,772 | 7/1989 | Metroka et al. ........................... 379/61 |
| 4,864,523 | 9/1989 | Sasaki ..................................... 364/708 |
| 4,897,873 | 1/1990 | Beutler et al. ........................... 379/433 |
| 4,959,887 | 10/1990 | Gruenberg et al. ....................... 16/223 |
| 4,961,126 | 10/1990 | Suzuki ..................................... 361/398 |
| 5,001,659 | 3/1991 | Watabe .................................... 364/708 |
| 5,014,346 | 5/1991 | Phillips et al. ............................ 455/89 |
| 5,027,394 | 6/1991 | Ono et al. ................................ 379/434 |
| 5,141,446 | 8/1992 | Ozouf et al. ............................. 439/165 |
| 5,170,173 | 12/1992 | Krenz et al. ............................. 343/702 |
| 5,259,019 | 11/1993 | Stilley ....................................... 379/58 |
| 5,260,998 | 11/1993 | Takagi ..................................... 379/433 |
| 5,335,273 | 8/1994 | Takagi et al. ............................ 379/433 |
| 5,394,297 | 2/1995 | Toedter .................................... 361/683 |

FOREIGN PATENT DOCUMENTS

| | | |
|---|---|---|
| 59-135960 | 8/1984 | Japan . |
| 59-135959 | 8/1994 | Japan . |
| 2 300 670 | 11/1996 | United Kingdom . |
| 2 331 188A | 5/1999 | United Kingdom . |
| WO 92/17974 | 10/1992 | WIPO . |
| WO 92/20181 | 11/1992 | WIPO . |
| WO 93/18592 | 9/1993 | WIPO . |

*Primary Examiner*—Leo P. Picard
*Assistant Examiner*—Jayprakash N. Gandhi
*Attorney, Agent, or Firm*—John G. Rauch; Brian M. Mancini; Michael C. Soldner

[57] ABSTRACT

An electronic device such as a radiotelephone (100) includes a bottom housing (108) defining a first hinge aperture (2207) and a slot (2208) adjacent the first hinge aperture. A top housing (102) defines a second hinge aperture (2223) having an inner rotation surface (2226). A shaft (2210) extends from the first housing at the first hinge aperture. The shaft is sized for insertion in the second hinge aperture and terminates in a bearing surface (2216), the inner rotation surface pivoting on the bearing surface as the second housing moves in relation to the first housing. The shaft and the bearing surface both define a shaft slot (2218) aligned with the slot in the first housing for routing a flexible circuit element (216) between the first housing and the second housing.

21 Claims, 27 Drawing Sheets

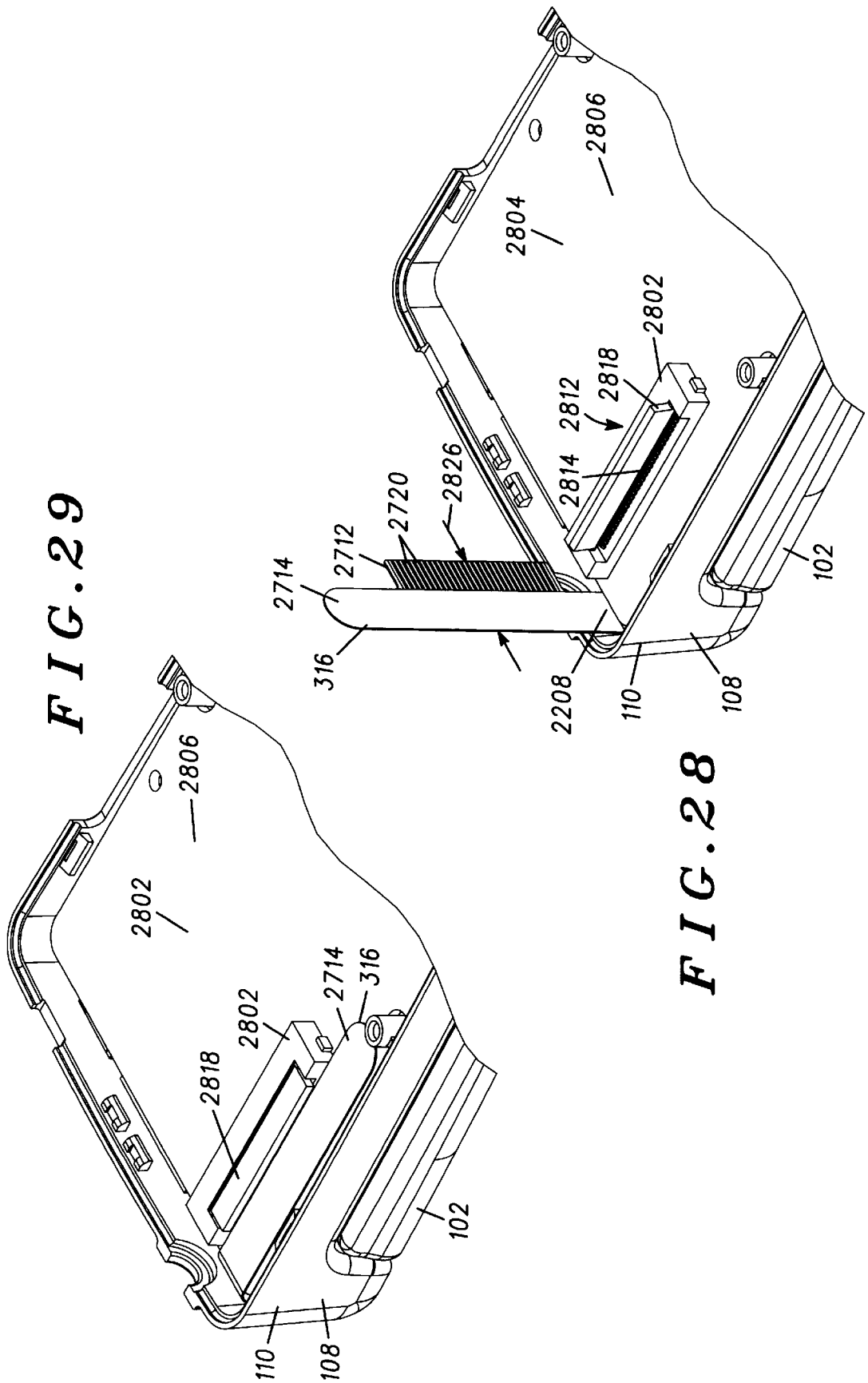

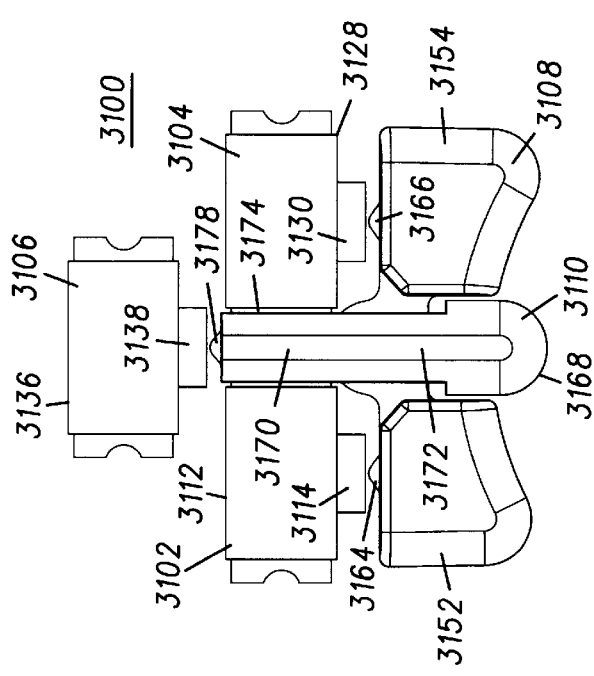
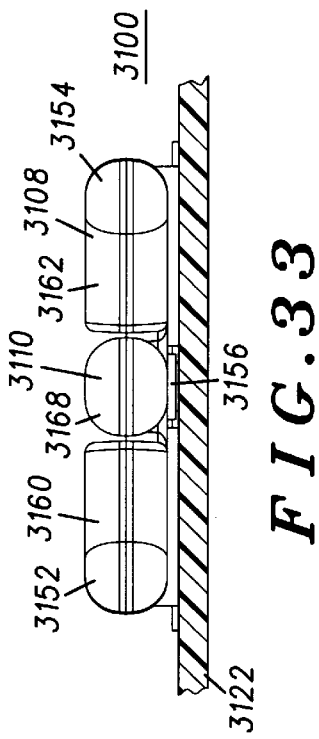
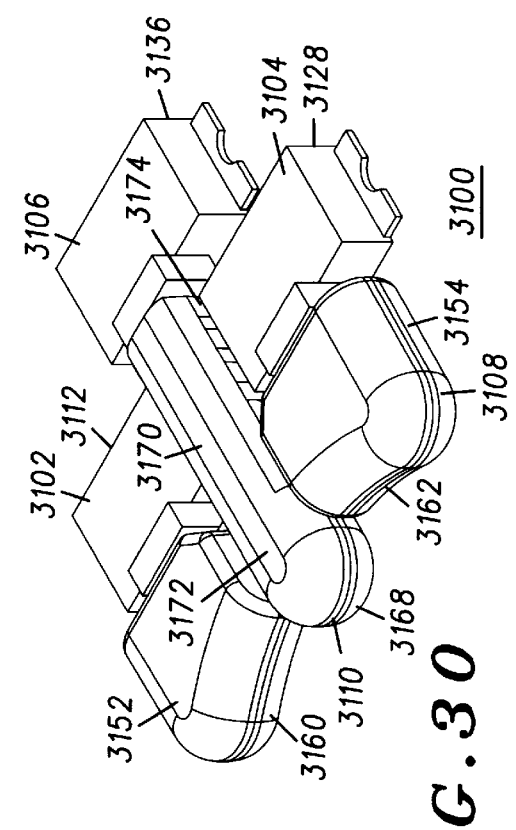
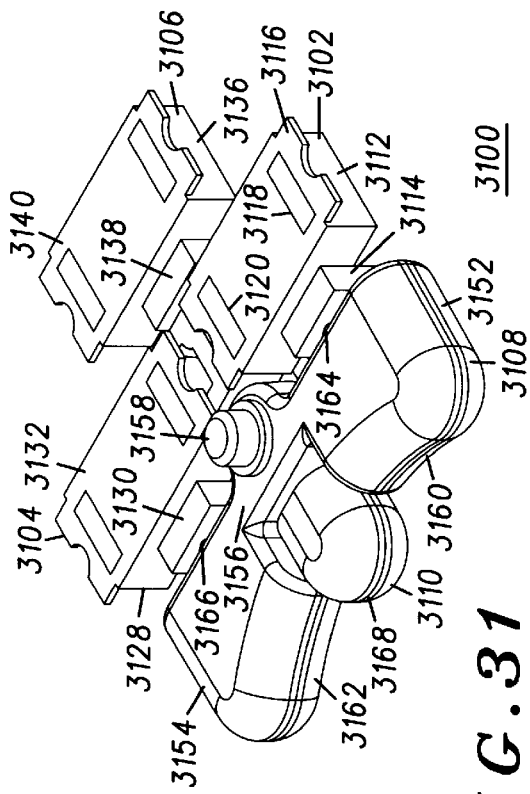

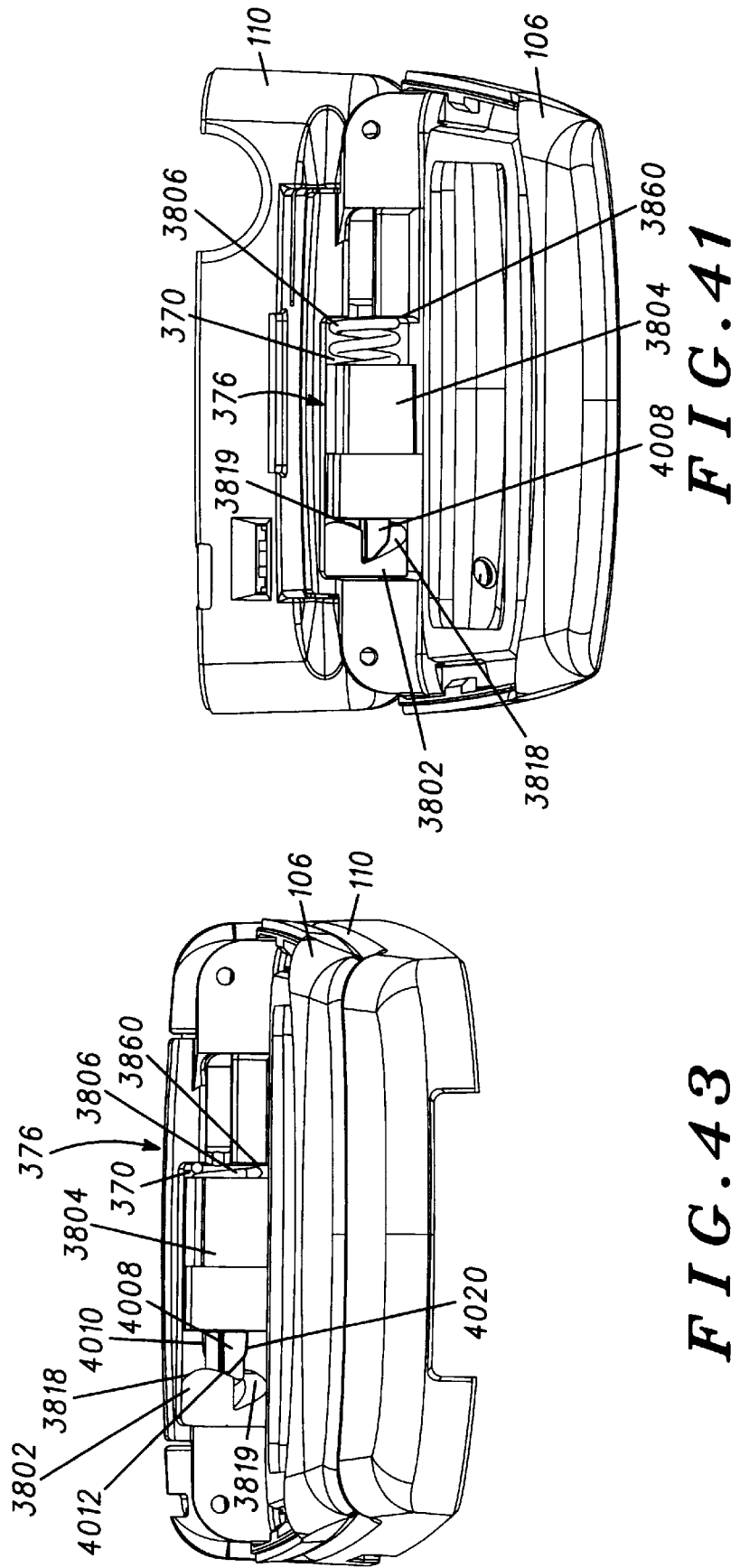

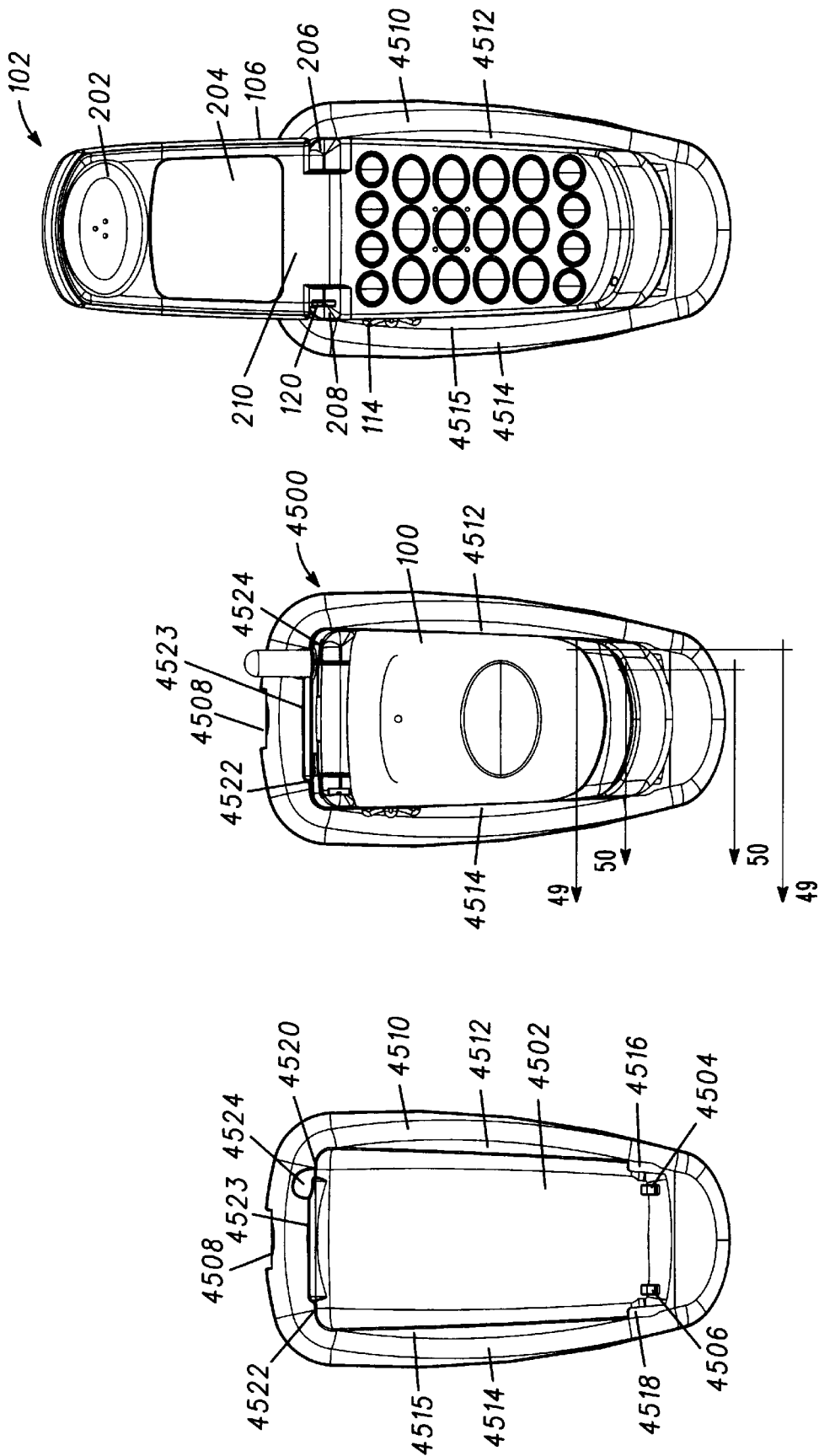

ELECTRONIC DEVICE INCLUDING APPARATUS AND METHOD FOR ROUTING FLEXIBLE CIRCUIT CONDUCTORS

FIELD OF THE INVENTION

The present invention generally relates to apparatus for routing conductors. More particularly, the present invention relates to an electronic device including an improved apparatus for routing flexible circuit conductors.

BACKGROUND OF THE INVENTION

Electronic devices continually are reduced in size and weight, particularly portable electronic devices. One example of such a portable electronic device is a portable communication device such as a pager or a radiotelephone.

Reduction in size and weight provides convenience for the user. Smaller electronic devices are more easily carried and thus may be used in more applications in more locations. Smaller lighter electronic devices are designed for easy, portable use.

One technique for reducing size of electronic devices is providing more than one housing containing the operational circuitry. A movable housing element is provided which can be collapsed or folded against another housing element to reduce the size of the electronic device in a stowed position, and extended or unfolded to an operational position. Examples of such electronic devices include foldable radiotelephones of the type having a hinged keypad cover and of the clam shell type.

However, during use of foldable housing elements, operational circuitry in the separate housing elements must communicate. For example, radiotelephones with hinged keypad covers have included a microphone or an antenna in the keypad cover which must be electrically coupled to the main radio circuit in the main housing. Flexible circuit elements, or flex strips, or flex, have been developed to convey electrical signals using metallic conductors on a flexible substrate.

As electronic devices continue to shrink, the desire has remained to more evenly distribute the operational circuitry between multiple housing elements. This means flexible circuit elements must have more conductors or traces to handle increased number of signals. More conductors increase the width of the flexible circuit element. However, wider flex strips create additional problems of routing between housing elements and of termination to a printed wiring board (PWB).

In one known clam shell radiotelephone design, a hinge element between upper and lower housings is interrupted to provide a flex barrel routing a flex between the housings. This radiotelephone uses a stationary, externally exposed housing for the routing of the flex as well as a stationary shaft, on which a movable housing pivots. Use of so many elements complicates the assembly and thereby increases the manufacturing cost of the radiotelephone. Moreover, the flex circuit is still visible where it passes from the flex barrel to the housing. Since it is visible, it is also susceptible to damage and can detract from the appearance of the radio.

At the printed wiring board, the flex strip must be electrically terminated. Connectors such as a zero insertion force (ZIF) connector have been developed to mechanically receive the end of a flex strip and create an electrical connection between conductors or traces on the flex and conductors on the PWB. However, the spacing of the electrical conductors on the ZIF connector is limited by manufacturing tolerances. The current limitation is typically 0.50 mm conductor pitch. When used with flex having a large number of traces, such a connector is too large for practical use. A flex strip with 30 traces requires a connector more than 15 mm wide. This is too large to accommodate on a PWB of many small electronic devices. Moreover, routing a flex strip 15 mm wide may not be mechanically possible, given the small size of mechanical features.

Accordingly, there is a need in the art for improved method and apparatus for routing flexible circuit elements in electronic devices.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, and wherein:

FIG. 28 shows a detailed view of the radiotelephone of FIG. 1;

FIG. 29 shows a detailed view of the radiotelephone of FIG. 1;

FIG. 30 is an isometric view of a first embodiment of a switch assembly for use with the radiotelephone of FIG. 1;

FIG. 31 is a reverse isometric view of the switch assembly of FIG. 30;

FIG. 32 is a top plan view of the switch assembly of FIG. 30;

FIG. 33 is front view of the switch assembly of FIG. 30;

FIG. 41 is a consolidated, fragmentary, bottom perspective view of the foldable device of FIG. 1 in the opened position;

FIG. 43 is a consolidated, fragmentary, top perspective view of the foldable device of FIG. 1 in the closed position;

FIG. 46 is a top plan view of charging base 4500 according to the present invention;

FIG. 47 is a top plan view of radiotelephone 100 in the closed postion in charging base 4500 according to the present invention;

FIG. 48 is a top plan view of radiotelephone 100 in the closed postion in charging base 4500 according to the present invention;

DETAILED DESCRIPTION OF A PREFERRED EMBODIMENT

Figure 1:
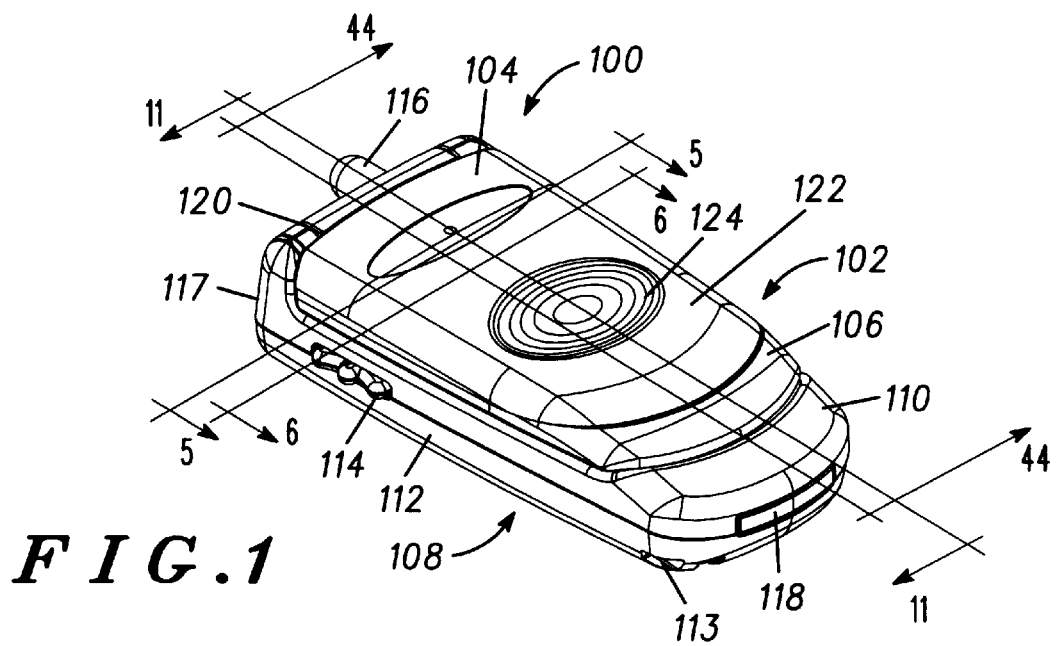
FIG. 1 is a perspective view of a radiotelephone in an open position.

Turning to FIG. 1, a perspective view shows a radiotelephone 100 in a closed position. Radiotelephone 100 comprises a top housing 102 having a back portion 104 and a front portion 106, and a bottom housing 108 having a front portion 110 and a back portion 112. The back portion of the bottom housing includes a first guide slot 113, which will be described in more detail in the remaining figures. The bottom housing also includes a switch assembly 114 preferably on the side of the radiotelephone and an antenna 116 generally extending from the rear 117 of the radiotelephone. A connector 118 is also provided to generally enable input/output of data or provide a port for a cigarette lighter adapter. An indicator 120, such as a light guide for a light emitting diode (LED), is incorporated in a knuckle of the hinge of the radiotelephone. Finally, back portion 104 of the top housing comprises a top surface 122 having a finger locator 124.

Figure 2:
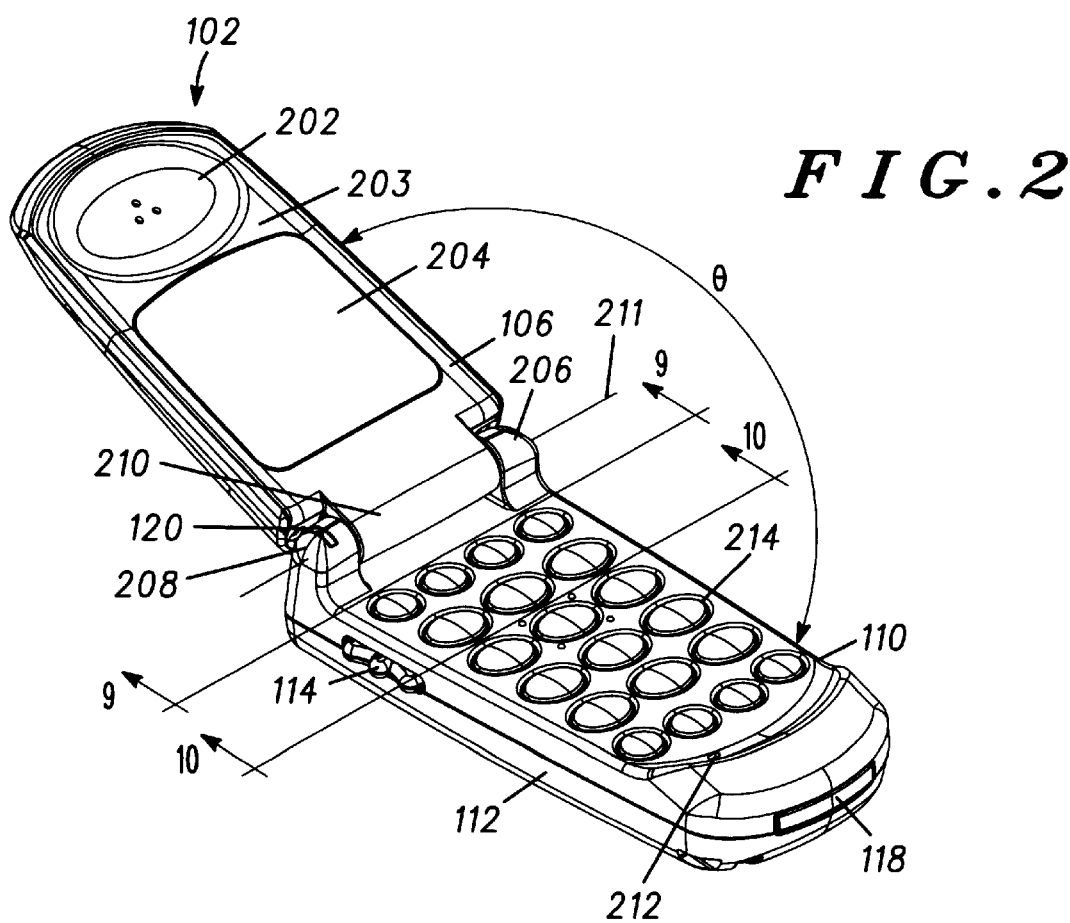
FIG. 2 is a perspective view of the radiotelephone of FIG. 1 in a closed position.

Turning now to FIG. 2, radiotelephone 100 in the open position shows top housing 102 hingedly connected to bottom housing 108. Front portion 106 of the top housing comprises an ear piece 202 defined in bottom surface 203 and a lens 204 positioned in an aperture in the top housing. Front portion 110 of the bottom housing comprises a first knuckle 206 and a third knuckle 208 which are coupled to a second knuckle 210 of the top housing 102. The operation of the hinge will be described in more detail in reference to the remaining figures.

Figure 3:
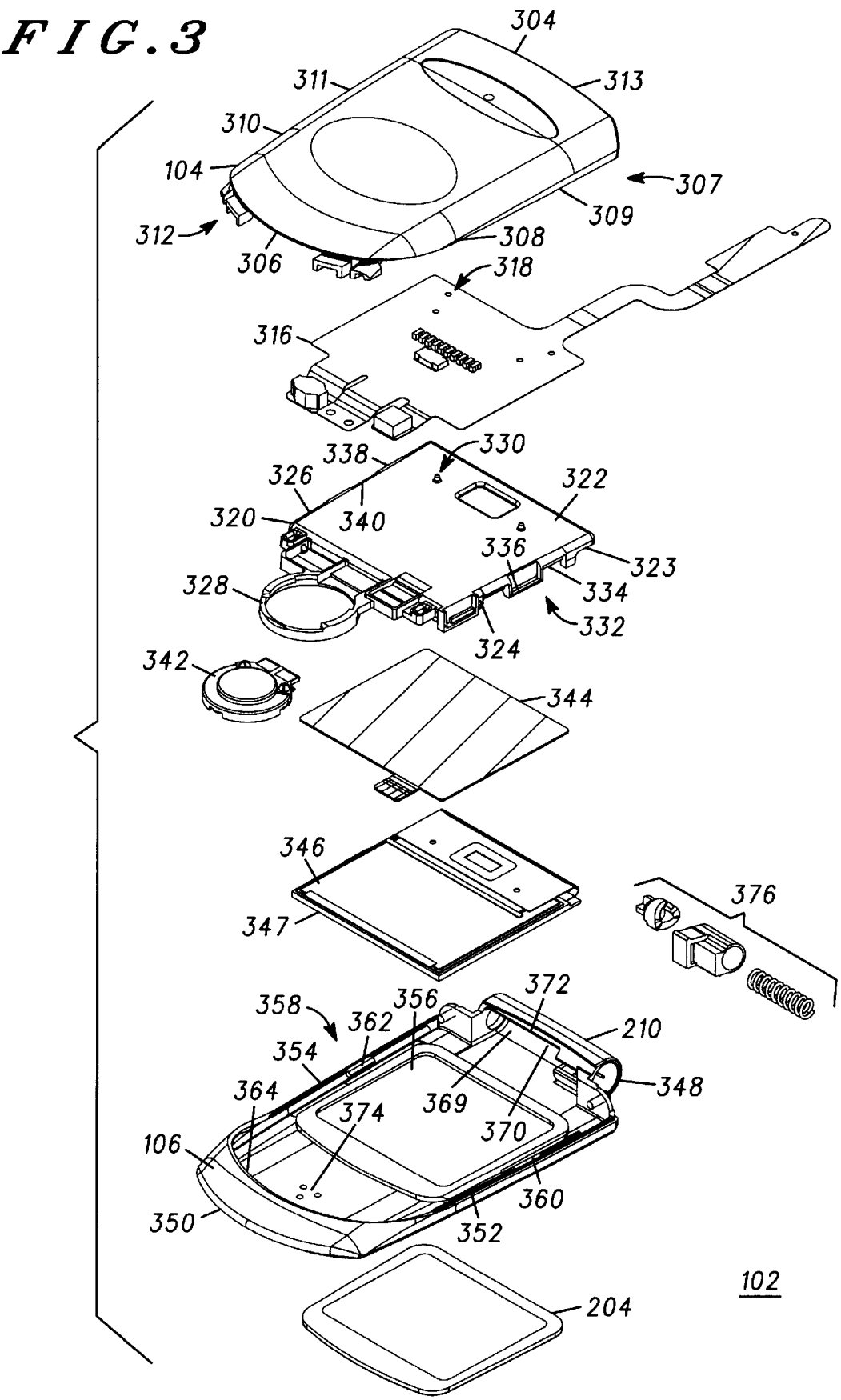
FIG. 3 is a top perspective exploded view of a top housing of the radiotelephone.
Figure 4:
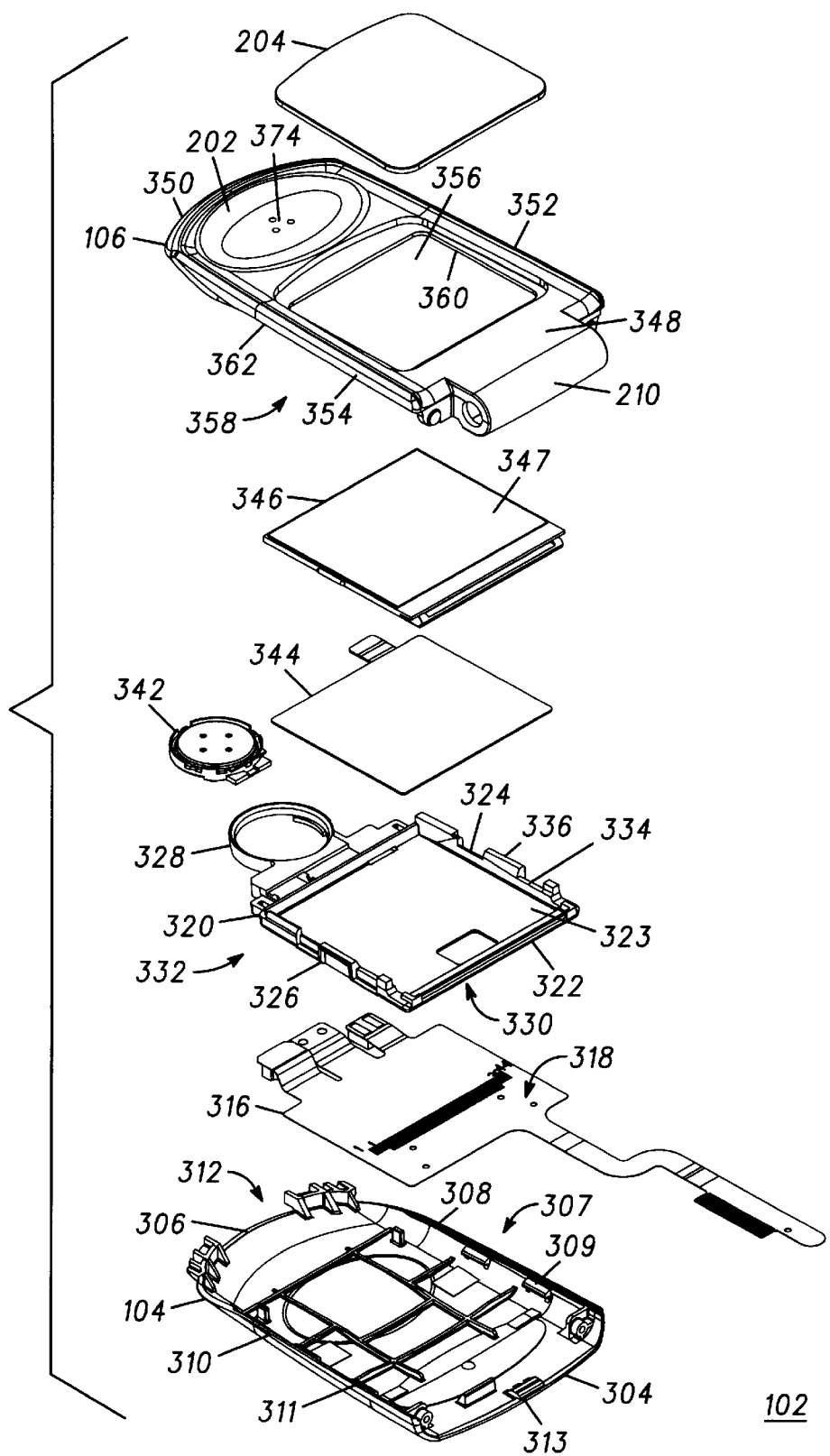
FIG. 4 is a bottom perspective exploded view of the top housing of the radiotelephone.

FIG. 3 and FIG. 4 show a top perspective exploded view and a bottom perspective exploded view, respectively, of top housing 102. Top housing 102 includes back portion 104, a flexible circuit element 316, a chassis 320, a speaker 342, an electroluminescent (EL) panel 344 with an adhesive backing, a display 346 having a display area 347, front portion 106, and lens 204.

Back portion 104 defines a first end 304, a second end 306, a first side 308, and a second side 310. As shown clearly in FIG. 3, back portion 104 includes a plurality of tabs 312 located on second end 306. The plurality of tabs 312 may include a longer single tab (not shown) along a tip of second end 306. As shown clearly in FIG. 4, back portion 104 also includes a tab 313 on first end 304 and a plurality of tabs 307 on first and second sides 308 and 310, such as a tab 309 on first side and a tab 311 on second side 310.

Referring back to FIG. 3, chassis 320 defines a surface 322, a surface 323, a first side 324, and a second side 326. Chassis 320 forms a speaker retainer 328, a plurality of tabs 330 on surface 322, and a plurality of catches 332 along first side 324 and second side 326. The plurality of catches 332 includes catches 334 and 336 on first side 324 and catches 338 and 340 on second side 326 (more clearly shown in FIG. 4). The plurality of catches 332 alternate along first and second sides 324 and 326 with catch surfaces facing opposing directions and elevated at different heights.

Front portion 106 defines a first end 348, a second end 350, a first side 352, a second side 354. As shown clearly in FIG. 4, front portion 106 defines earpiece 202 having a plurality of holes 374 defined therein and an opening 356. As shown clearly in FIG. 3, front portion 106 also includes second knuckle 210 on first end 348, a slot 364 or a lip on second end 350, and a plurality of tabs 358 along first side 352 and second side 354. The plurality of tabs includes a tab 360 on first side 352 and a tab 362 on second side 354. Second knuckle 210 forms a pocket 370 for a hinge 376 and an aperture 369 to pocket 370.

Top housing 102 may be assembled as follows. Flexible circuit element 316 is disposed on surface 322 of chassis 320 such that the plurality of tabs 330 insert through the plurality of holes 318 for proper alignment and retention. Speaker 342 is disposed in and retained by speaker retainer 328 and coupled to flexible circuit element 316. EL panel 344 is adhered to surface 323 of chassis 320 and display 346 is placed in abutment therewith.

Figure 5:
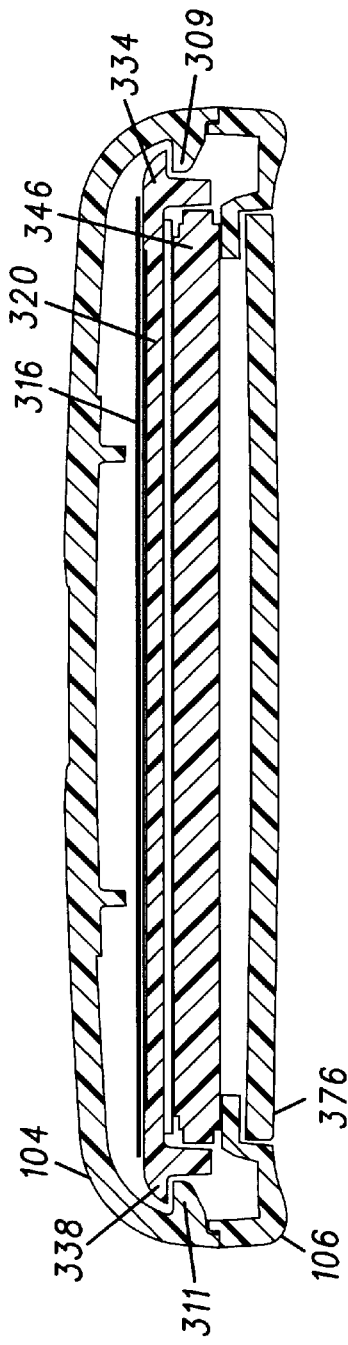
FIG. 5 is a cross sectional view of the top housing taken along a line 5—5 of FIG. 1.

Carrying flexible circuit element 316, speaker 342, EL panel 344, and display 346, chassis 320 is disposed in front portion 104. Chassis 320 and front portion 104 are made from a pliable material and are sized to provide a snap fit therebetween, where the plurality of tabs 307 engage some of the plurality of catches 332. For example, as shown in FIG. 5, which is a cross section view taken along a line 5–5' of FIG. 1, tab 309 engages catch 334 on first side 308 and tab 311 engages catch 338 on second side 310.

Figure 6:
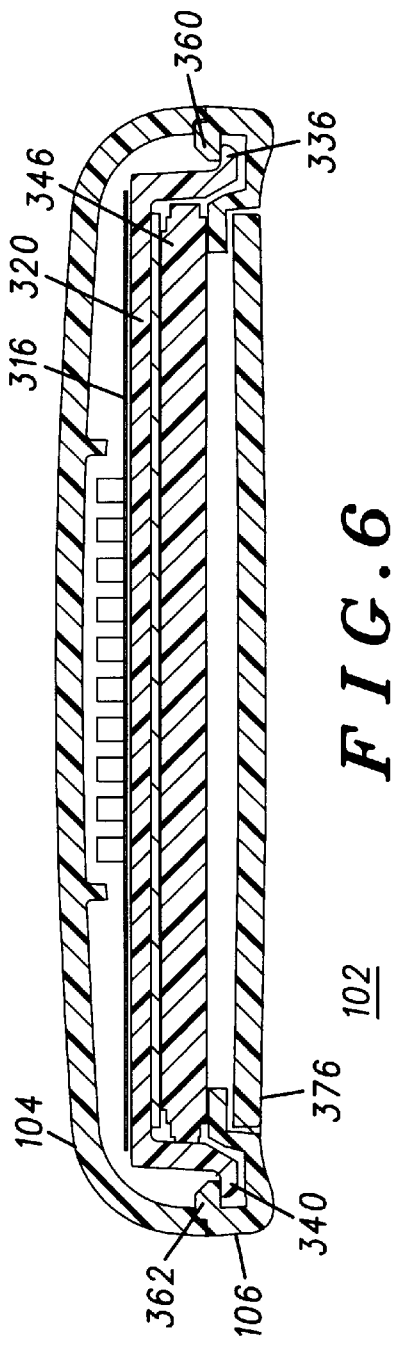
FIG. 6 is a cross sectional view of the top housing taken along a line 6—6 of FIG. 1.

Referring back to FIG. 3 and FIG. 4, lens 204 is disposed on front portion 106 around a perimeter of opening 356 and is secured thereto. Second end 306 of back portion 104 is brought toward second end 350 of front portion 106 such that the plurality of tabs 312 insert within slot 364. First end 304 of back portion 104 is brought toward first end 348 of front portion 106 such that tab 313 meets an edge 372 of second knuckle 210. Chassis 320, front portion 106, and back portion 104 are made from a pliable material and are sized to provide a snap fit therebetween, where tab 313 overcomes edge 372 and the plurality of tabs 358 engage some of the plurality of catches 332. For example, as shown in FIG. 6, which is a cross section view taken along a line 6–6' of FIG. 1, tab 360 engages catch 336 and tab 362 engages catch 340.

Thus, back and front portions 104 and 106 are secured to each other with the plurality of tabs 312, tab 313, slot 364, and aperture 369. Also, back portion 104 is secured to chassis 320 with the plurality of tabs 307 and some of the plurality of catches 332, and front portion 104 is secured to chassis 320 with the plurality of tabs 358 and some of the plurality of catches 332.

Figure 7:
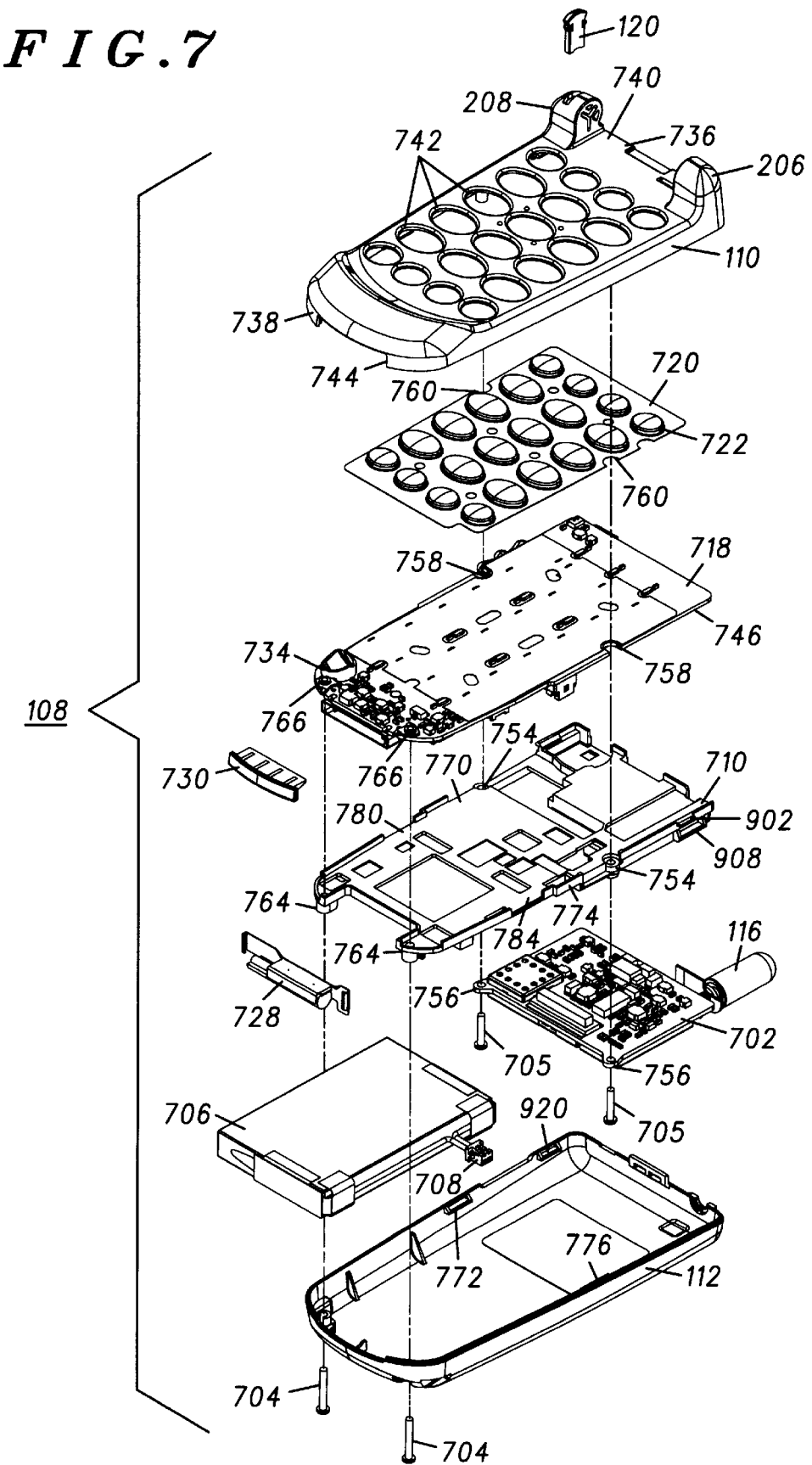
FIG. 7 is a first exploded view of the bottom housing of the radiotelephone of FIG. 1.

Referring now to FIG. 7, an exploded view of the bottom housing 108 of the radiotelephone 100 shows the components of the bottom housing 108. The bottom housing 108 includes the front portion 110, a keypad 720 including a plurality of keys 722, a logic board 718, a chassis 710, a transceiver board 702, a battery 706 and a back portion 112. The bottom housing 108 further includes a vibrator assembly 728, a data port cover 730 and the indicator 720.

The front portion 110 defines the top surface 740 of the bottom housing 108 and provides the structure which engages the top housing 102. At a first end 736, the front portion 110 includes the first knuckle 206 and third knuckle 208. The top surface 740 defines a plurality of keyholes 742 through which extend the keys 722 of the keypad. The keyholes 742 are sized and positioned to receive the keys 722. At a second end 738, the front portion 110 defines an aperture 744 which provides access to the connector 118. The top surface 740 of the bottom housing 108 is contoured to fit the top housing 102 when the radiotelephone 100 is folded closed.

The keypad 720 including the keys 722 is preferably formed from a single membrane to be impervious to dirt and moisture. The keys 722 may be arranged in any suitable configuration, including differing numbers and sizes of keys. The illustrated configuration is illustrative only. The keypad 720 rests on metal domes which provide a snap feel during key actuation.

The keypad 720 is disposed in the bottom housing 108 next to the logic board 718. The logic board 718 generally includes a printed wiring board (PWB) 746 with components such as integrated circuits 748 attached to the PWB 746. The logic board 718 provides electronic functionality for the radiotelephone 100. Thus, the logic board 718 generally includes a processor or other controller which controls speech processing, timing, man-machine interface and system interface functions. Subsystems of the logic board 718 include a clock circuit which generates timing signals, a speech processor, a battery monitor including internal recharge control, memory for data storage, and input/output control.

Figure 8:
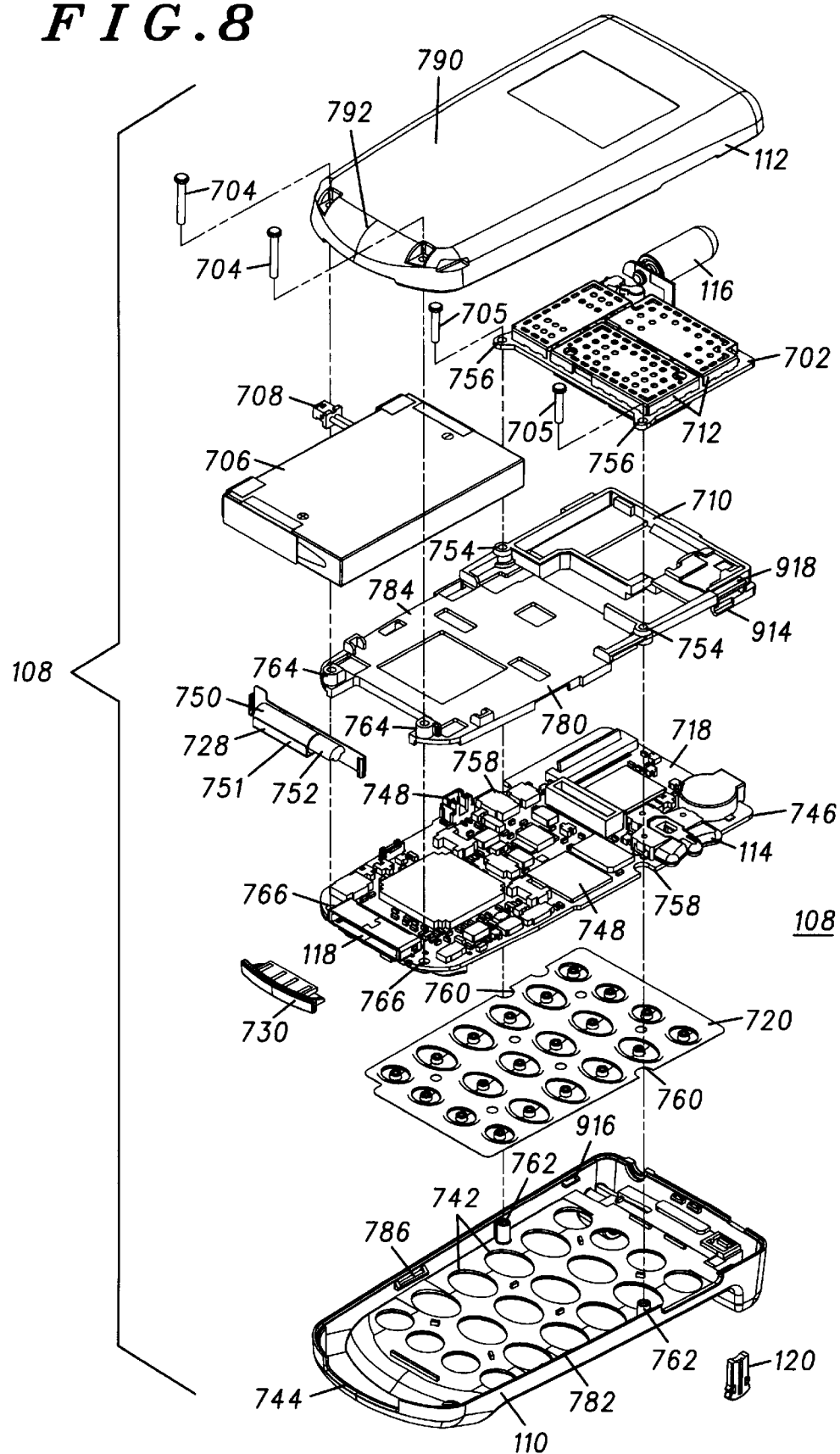
FIG. 8 is a second exploded view of the bottom housing of the radiotelephone of FIG. 1

Similarly, the transceiver board 702 controls the RF operation of the radio. The transceiver board 702 generally includes a transmitter, a power amplifier, a receiver, a duplexer or antenna switch, filters, a demodulator, a modulator and a frequency synthesizer. As is shown in FIG. 8, a portion of the circuitry on the transceiver board 702 is covered by one or more RF shields 712 to limit electromagnetic interference with surrounding circuitry.

The battery 706 in the illustrated embodiment is a self-contained, non-replaceable, rechargeable battery. The battery 706 is electrically coupled to the remainder of the radiotelephone 100 by a connector 708 which plugs into a suitable receptacle 748 on the logic board 718. In alternative embodiments, the battery 706 may be replaceable, for example, by removing a panel and disconnecting the battery 706. In the present embodiment, a non-removable battery was chosen to reduce the size of the radiotelephone 100 while maximizing the physical size and storage capacity of the battery 706. If the battery is removable, the battery 706 must be encased in a protective plastic housing, which limits the volume available for storage cells of the battery. Using a non-removable battery without a protective plastic case maximizes the volume used for storage cells and thereby maximizes the storage capacity of the battery 706.

The vibrator assembly 728 includes a motor 750 and a cam 752 and a vibrator bracker 753. To provide a silent alert, in lieu of or in addition to an audible ringer tone, the radiotelephone 100 under control of the logic board 718 turns on the motor 750 to turn the cam 752. When rotated, the unbalanced shape of the cam 752 produces a vibration sensation which alerts the user of an incoming call or other condition. The vibrator motor 750 is disposed on the vibrator bracket 751. The vibrator bracket 751 is located on and retained by one or more bosses so that the vibraator assembly rests on top of connector 118 (as viewed in FIG. 8). Thus, the vibrator assembly 728 is contained within the bottom housing 108 without occupying any space on the logic board 718.

The data port cover 730 fits in the aperture 744 formed by the front portion 110 to cover and protect the connector 118. In alternative embodiments, the data port cover 730 may be retained by a lanyard or other means to prevent loss.

A pair of screws 705 retains the transceiver board 702, the chassis 710, the logic board 718 and the keypad 720 with the front portion 110. The transceiver board 702 includes grommets 756 which engage the heads of the screws 705. The chassis 710 includes grommets 754 through which the screws 705 pass. Similarly, the logic board 718 includes cutouts 758 and the keypad includes cutouts 760 which engage the screws 705. The front portion 110 includes threaded retainers 762 which receive and retain the screws 705.

A second pair of screws 704 retains the back portion 112, the chassis 710 and the logic board 718. The screws 704 are inserted through the back portion 112 and extend through bosses 764 of the chassis 710. The threaded ends of the screws 704 are then inserted in holes 766 of the logic board 718 to complete the assembly.

An outer surface 790 of back portion 112 is preferably slightly convex, and leads to a contoured edge 792. The function of outer 790 and contoured edge 792 will be described in more detail in reference to FIG. 45.

Figure 9:
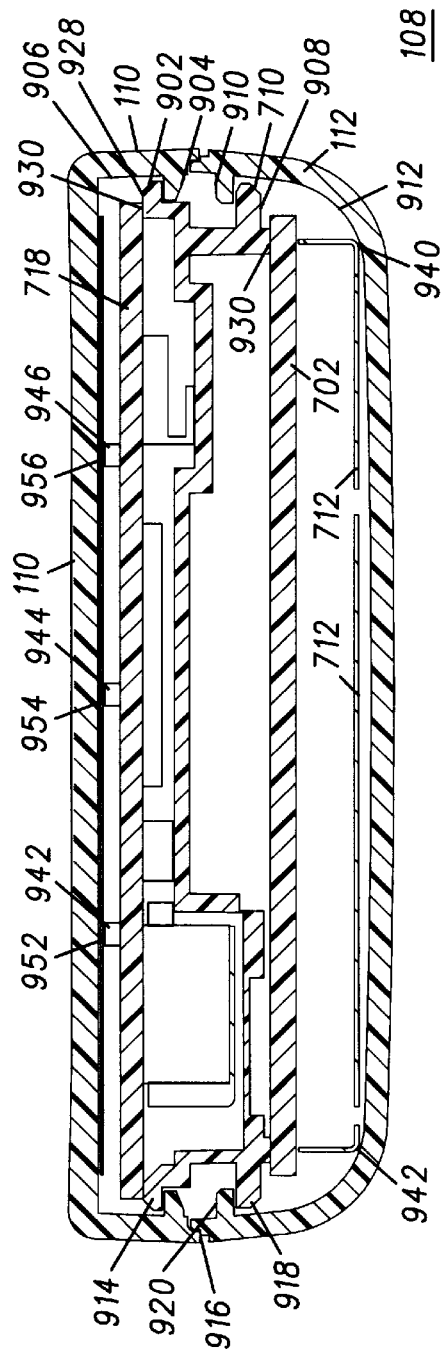
FIG. 9 is a cross sectional view taken along line 9—9 of FIG. 2.

Referring now to FIG. 9, it shows a cross section of the bottom housing 108 taken along line 9–9' in FIG. 2. FIG. 9 shows the manner in which components of the bottom housing 108 are securely retained in the bottom housing 108. FIG. 9 shows the logic board 718, the chassis 710 and the transceiver board 702 disposed in the assembled bottom housing 108.

The chassis 710 includes snap-fit tabs which engage corresponding tabs of the front portion 110 and the back portion 112 of the bottom housing 108. On the right side of FIG. 9, the chassis 710 includes a tab 902 which engages a tab 904 on the inner surface 906 of the front portion 110. Similarly, the chassis 710 includes a tab 908 which engages a tab 910 on the inner surface 912 of the back portion 112. On the left side of FIG. 9, the chassis 710 includes a tab 914 which engages a tab 916 on the inner surface 906 of the front portion 110 and a tab 918 which engages a tab 920 on the inner surface 912 of the back portion 112. Some of these tabs are visible in FIG. 7 and FIG. 8. As can be seen in FIG. 7, the chassis 710 further includes a tab 770 which engages a tab 772 on the back portion 112 and a tab 774 which engages a tab 776 on the back portion 112. In FIG. 8, the chassis 710 further includes a tab 780 which engages a tab 782 on the front portion 110 and a tab 784 which engages a tab 786 on the front portion 110. These tabs serve to securely locate and retain the chassis 710 in place in the bottom housing 108.

Referring again to FIG. 9, in particular the right side of FIG. 9, to retain the logic board 718, a point 928 of the chassis 710 engages the logic board 718 at a first point 930 on the logic board. Preferably, the point 928 is a portion of the tab 902 such that the logic board 718 asserts a force on the tab 902 in a first direction (downward in FIG. 9) which is opposite the second direction (upward in FIG. 9) of the force asserted by the tab 904 of the front portion 110. The counteracting forces operate to snugly retain all elements. Similarly, a point 930 on the chassis 710 engages the transceiver board 702 at a point 932 on the transceiver board. Again, preferably, the point 930 is a portion of the tab 908 such that the transceiver board 702 asserts a force on the tab 908 in the second direction which is opposite the first direction of the force asserted by the tab 910 of the back portion 112. The chassis 710 engages the logic board 718 and the transceiver board 702 in a similar manner on left side of FIG. 9.

This manner of engaging the front and back portions and the transceiver and logic boards operates to lock all components in place and reduces the need for screws to hold the bottom housing 108 together. Screws add to the manufacturing cost and weight to the completed assembly, so a snap-fit design is preferable.

To further brace the assembled components within the bottom housing 108, the RF shield 712 of the transceiver board engages the inner surface 912 of the back portion 112 at point 940 and point 942. Similarly, the logic board 718 includes a protrusion 942, a protrusion 944 and a protrusion 946 which all engage the front portion 110 at a point 952, point 954 and point 956, respectively. In the illustrated embodiment, a portion of the keypad 720 is retained between the protrusions and the engagement points to secure the keypad 720.

Also in the illustrated embodiment, the securement structure illustrated in the cross section of FIG. 9 is located at the end of the radiotelephone 100 which connects to the top housing 102. Because of the movement of the top housing 102 relative to the bottom housing 108, and because of potential added forces on the hinge assembly which joins the two housings, this area may be subject to particularly strong destructive forces. The illustrated securement structure reinforces the front portion 110 which includes the first knuckle 206 and the third knuckle 208, which join to the top housing 102.

Figure 10:
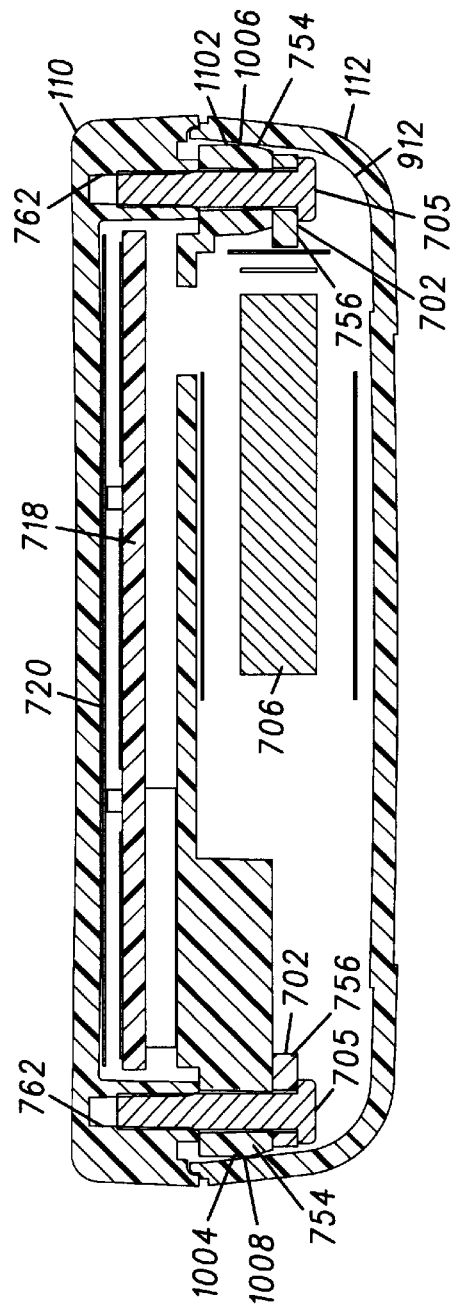
FIG. 10 is a cross sectional view taken along line 10—10 of FIG. 2.

Referring now to FIG. 10, it shows a cross section of the bottom housing 108 taken along line 10–10' in FIG. 2. FIG. 10 shows location and retention of the transceiver board 702, the chassis 710, the logic board 718 and the keypad 720 within the front portion 110 and the rear portion 112 of the bottom housing. In FIG. 10, the screws 705 extend through the grommet 756 and grommet 754 and are seated in the threaded retainers 762. A point 1002 and a point 1004 of the chassis 710 engage the inner surface 912 of the back portion 112 at a point 1006 and 1008, respectively. As is illustrated in FIG. 10, point 1002 and point 1004 are on the outer surface of the grommets 756. In this manner, the chassis 710 retained in place against laterally or torsional forces, both by the screws 705 and the engagement with the back portion 112.

Referring back to FIG. 1, radiotelephone 100 defines finger locator 124 on top surface 122 of top housing 102. In general, finger locator 124 is provided for finger positioning and engagement during communication when radiotelephone 100 is in the open position as shown in FIG. 2. Such engagement helps a user to apply pressure at a proper position on top surface 122 for increased acoustic coupling between an ear of the user and earpiece 202. As described herein, finger locator 124 may be referred to as a finger recess, a depression, an indentation, or an engagement portion.

Radiotelephone 100 is a portable communication device having a very small size. Top housing 102 has a length of about 7.6 cm and bottom housing 108 has a length of about 8.7 cm. Earpiece 202 forms a cup having an outline that is substantially elliptical, with a length of about 31 mm and a width of about 20 mm. Here, the open position provides an angle θ of about 160 degrees (FIG. 2). Other angles may be used, preferably ranging from about 150 to 170 degrees.

In the embodiment shown, finger locator 124 includes a concave recess which is shown by contour lines of FIG. 1. Otherwise, top surface 122 defines a substantially smooth and planar surface, although having a slight arcuate shape. Finger locator 124 is positioned such that it is surrounded by the substantially planar surface and is substantially centered in relation to a first side and a second side of top housing 102.

The recess of finger locator 124 defines a substantially smooth contour. In FIG. 1, a first outer contour line and a second outer contour line of finger locator 124 are shown to indicate a smooth or a rounded edge of the recess. Remaining contour lines of finger locator 124 indicate areas of decreasing depth to a center of the recess. In this embodiment, each of the remaining contour lines indicate a 0.15 mm depth decrease to the center, where finger locator has a maximum engagement depth of about 0.75 mm (from five remaining contour lines). Preferably, the recess has a maximum engagement depth within a range of about 0.5 mm to 2.0 mm.

In the embodiment shown, finger locator 124 defines an outline that is substantially elliptical. The recess may be described as if such depression was made by an ellipsoidal body or a fingerprint. Here, finger locator 124 has a length of about 28 mm and a width of about 19 mm. Thus, finger locator 124 is sized to fit a portion of a finger of a user during communication. Preferably, a longitudinal axis of finger locator 124 is perpendicular to a longitudinal axis of top housing 102. In addition, finger locator 124 is substantially symmetrical about its longitudinal and traverse axes. It is understood that other suitable outlines and forms for finger locator 124 are possible, such as an outline that is substantially circular where the depression is made by a spherical body.

Figure 11:
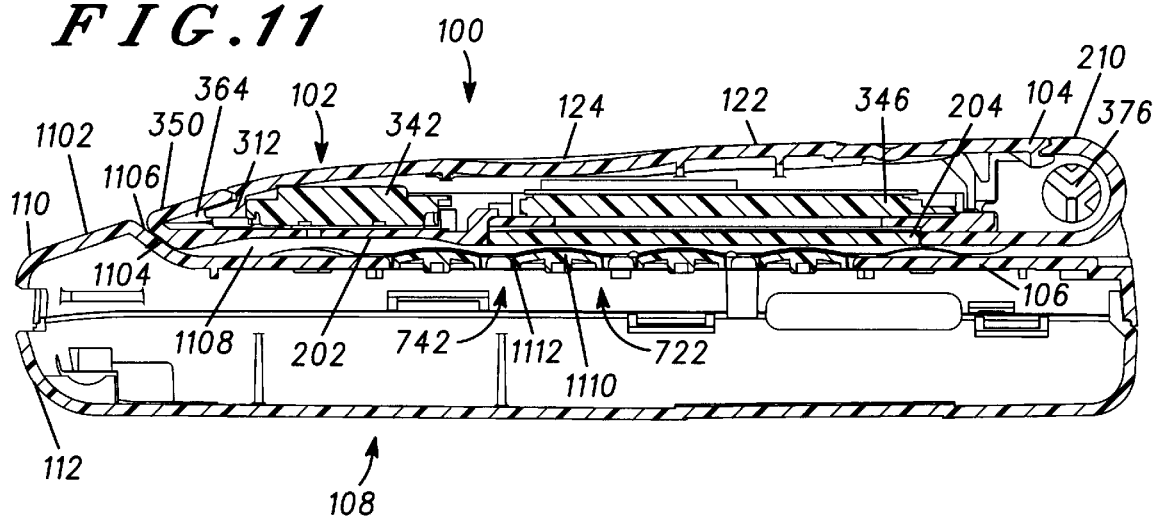
FIG. 11 is a cross section view of the radiotelephone taken along a line 11—11 of FIG. 1.

FIG. 11 is a cross section view of radiotelephone 100 in the closed position, taken along a line 11–11' of FIG. 1. Where the recess of finger locator 124 is formed, the thickness of back portion 104 remains substantially the same as the other areas for strength. In the embodiment shown, finger locator 124 is positioned on top surface 122 such that it is offset from earpiece 202. Top housing 102 includes speaker 342 disposed therein and directed outwards from earpiece 202. In this embodiment, finger locator 124 is offset such that it is not directly positioned behind speaker 342.

FIG. 11 additionally shows a protrusion 1102 formed by bottom housing 108. Protrusion 1102 has a surface 1106 that meets with a surface 1104 of a similar protrusion (although much smaller) formed by top housing 102. With such protrusions, top and bottom housings 102 and 108 are sized, configured, and connected such that a gap 1108 is formed therebetween in the closed position. This allows keys 722 to be extended through keyholes 742 where a portion of each key (such as a key 1110 through a keyhole 1112) is raised above a surface of bottom housing 108. Thus, keys 722 are easier to actuate, especially when compared to other keypad arrangements having keys flush with a surface.

Figure 12:
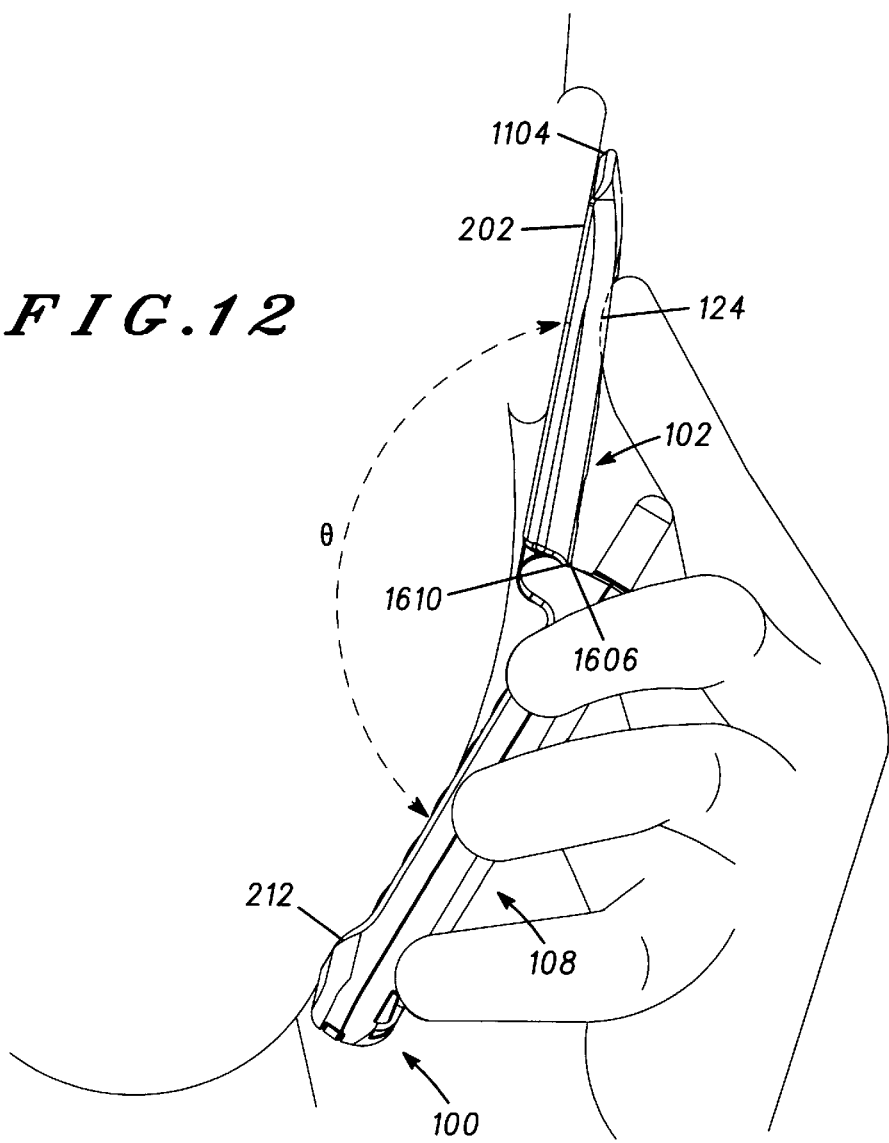
FIG. 12 is a perspective view of the radiotelephone held by a hand of a user, where a portion of a finger of the user is engaged with the finger locator.

As shown in FIG. 12, finger locator 124 is provided for engagement with a portion of a user's finger. Without finger locator 124, on a surface that is entirely substantially smooth and planar, little or no finger engagement to top housing 102 can occur and acoustic coupling with earpiece 202 may be diminished. Since finger locator 124 has a substantially smooth contour, finger locator assists in guiding the portion of the user's finger properly on top surface 122 for engagement. Also, since the longitudinal axis of finger locator 124 is perpendicular to the longitudinal axis of top housing 102, finger locator 124 assists in guiding the portion of the user's finger to a position that is substantially centered in relation to the first and second sides.

Thus, using finger locator 124, a user may locate the proper position for his or her finger on top surface 122. Finger locator 124 provides engagement for comfort and depression of earpiece 202 to an ear to increase acoustic coupling therebetween. Finger locator 124 may include a raised portion on top surface 122 for engagement. Preferably, such a raised portion includes substantially smooth edges and contours as described in relation to the preferred embodiment.

Figure 13:
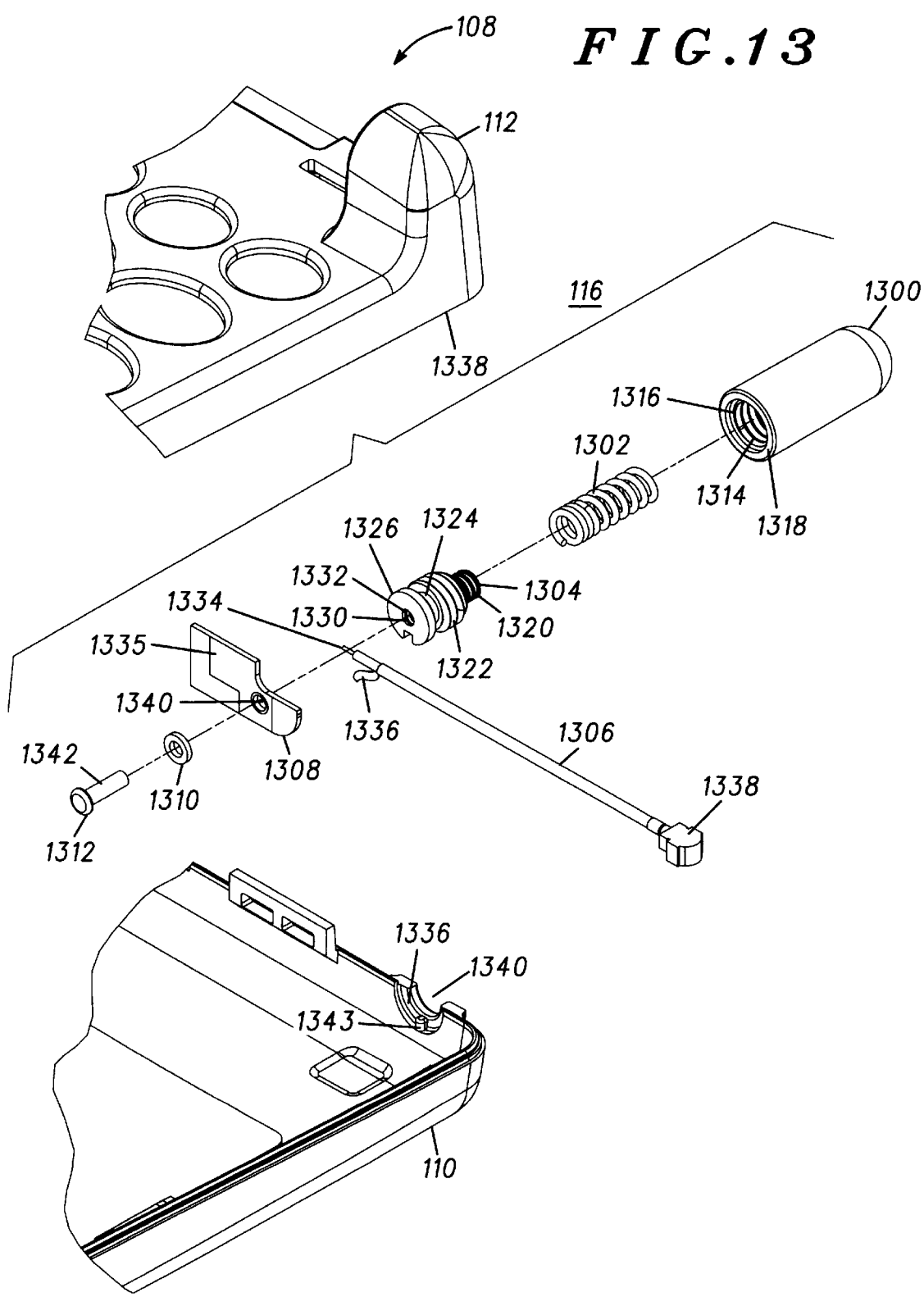
FIG. 13 is an exploded view of an antenna of the radiotelephone.

FIG. 13 is an exploded view of antenna 116. Antenna 116, which may be referred to as an antenna assembly, includes an antenna cap 1300, a helical coil 1302, a bushing 1304, a coaxial cable 1306, a substrate 1308 forming a ground plane, a washer 1310, and a screw 1312.

Antenna cap 1300 forms a pocket 1314 and includes a bushing threading 1316 in pocket 1314. A mating perimeter 1318 is formed around an opening of pocket 1314. Pocket 1314 is sized to fit helical coil 1302. Antenna cap 1300 is made from a durable and pliable material, preferably plastic.

Bushing 1304 forms a body including a cylindrical portion 1320 having a coil threading, a cylindrical portion 1322 having a cap threading, a cylindrical portion 1324, and a cylindrical portion 1326 having a notch 1328. Cylindrical portion 1320 has a diameter that is less than a diameter of cylindrical portion 1322, and cylindrical portion 1324 has a diameter that is less than a diameter of cylindrical portion 1326. Bushing 1304 also includes a pocket 1330 through a longitudinal axis thereof, which includes a screw threading 1332. In this embodiment, bushing 1304 is electrically conductive and forms cylindrical portions 1320, 1322, 1324, and 1326.

Coaxial cable 1306, which here provides an impedance of 50 ohms, includes a coax lead 1334, a coax sheathing 1336, and a connector 1338 coupled to coax lead 1334 and coax sheathing 1336. Substrate 1308 has a ground plane 1335 on a bottom side thereof and a hole 1340. Screw 1312 includes a screw threading 1342 and washer 1310 is preferably a non-conductive, nylon washer. In this embodiment, helical coil 1302 is a quarter wavelength monopole, where antenna 116 forms a half-wave dipole with ground plane 1334 and coaxial cable 1306.

For assembly, bushing 1304 is abutted to substrate 1308 such that a hole of pocket 1330 is aligned with hole 1340. Screw 1312 is inserted through washer 1310 and hole 1340 of substrate 1308. Next, screw 1312 is threadedly attached within bushing 1304 using screw threadings 1332 and 1342 such that bushing 1304 becomes snug fit against substrate 1308. Coax lead 1334 is then soldered to a bottom of cylindrical portion 1326, and coax sheathing 1336 is soldered to ground plane 1335. Helical coil 1302 is threadedly attached to the coil threading of cylindrical portion 1320, thereby coupling helical coil 1302 to coax lead 1334.

Back portion 110 and front portion 112 include counterbores 1336 and 1338, respectively, which form a hole 1340 for bottom housing 108 when back and front portions 110 and 112 are mated. First, bushing 1304 is nested in counterbore 1338. Coaxial cable 1306 is routed in front portion 112 and later coupled to a transceiver (not shown) with connector 1338. Back portion 110 is mated with front portion 112, where notch 1328 of bushing 1304 aligns with a key 1342 of back portion 110. Back and front portions 110 and 112 capture bushing 1304 around hole 1312.

After back and front portions 110 and 112 are secured, bushing threading 1316 of antenna cap 1300 is threadedly attached around the cap threading of cylindrical portion 1322. Antenna cap 1300 is turned until mating perimeter 1318 is abutted with a mating perimeter 1404 (FIG. 14) of bottom housing 108.

Figure 14:
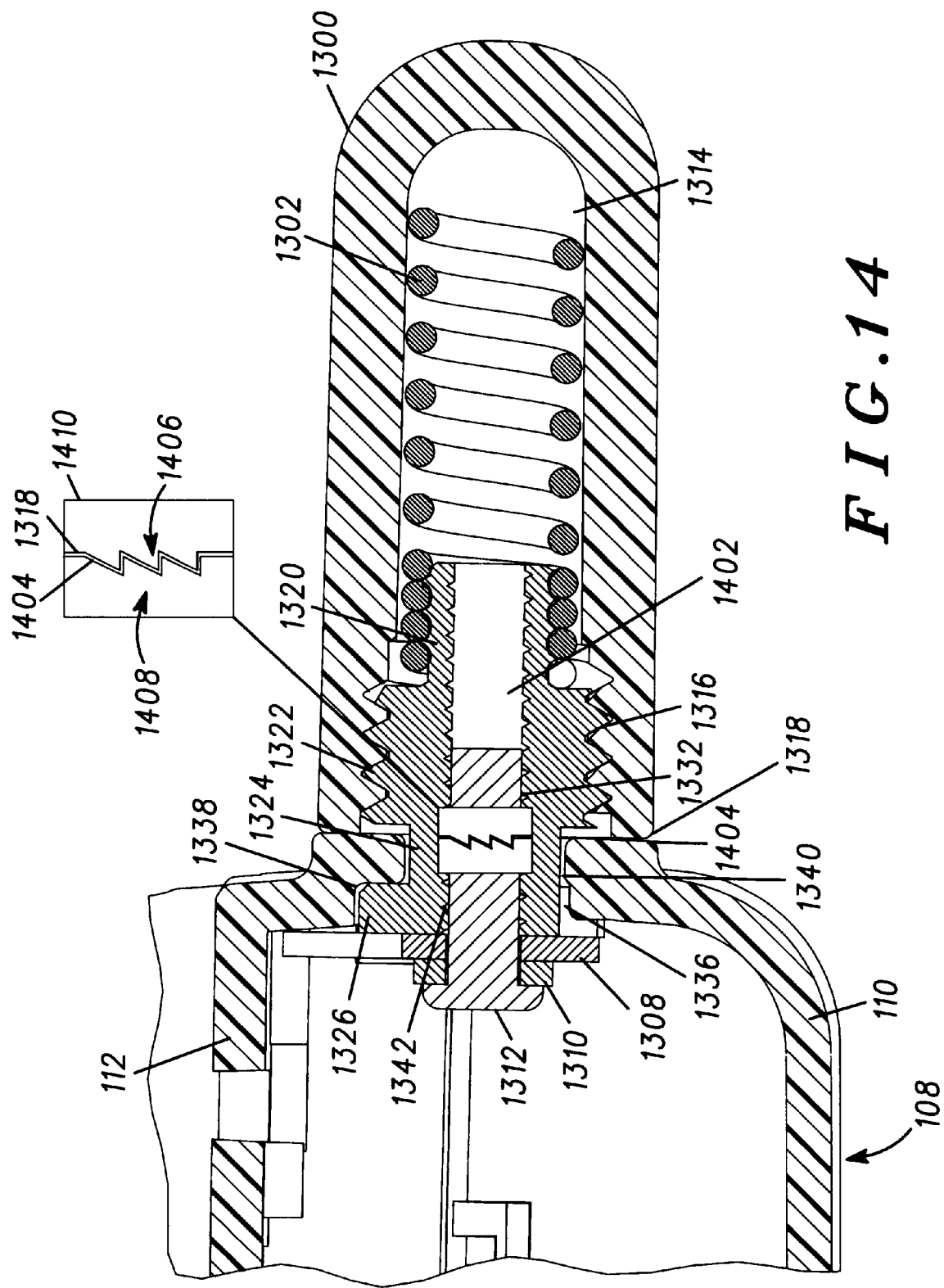
FIG. 14 is a cross section view of the antenna taken along a line 14—14 of FIG. 15.
Figure 15:
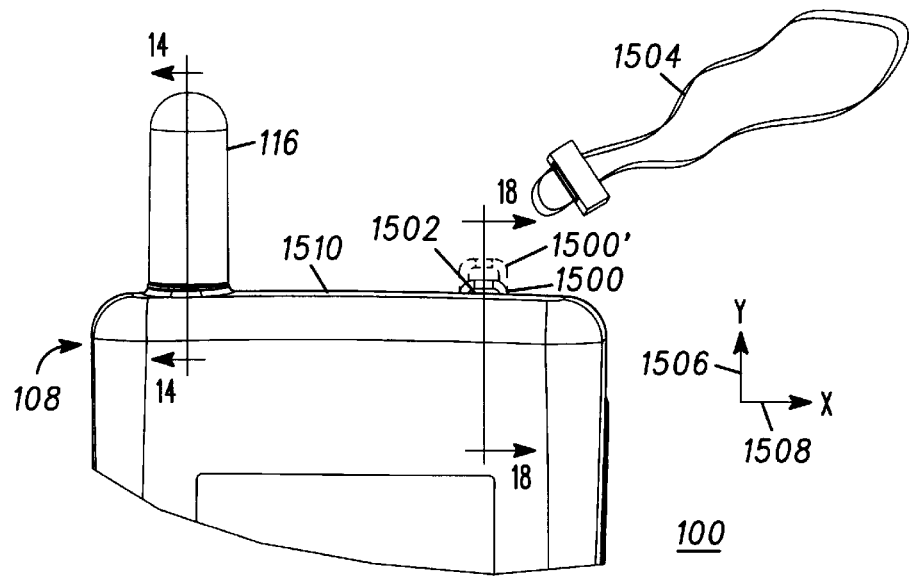
FIG. 15 is a rear plan view of a portion of the radiotelephone showing a lanyard bail movably disposed through a slot and having an extended position and a retracted position.

FIG. 14 is a cross sectional view of antenna 116 taken along a line 14–14' of FIG. 15. As shown in a non-cross sectional view 1410 of FIG. 14, mating perimeter 1318 preferably includes retaining notches 1406 formed therearound. Retaining notches 1406 may be referred to as locking notches. Mating perimeter 1404 of back portion 110 includes retaining notches 1408 that are sized and constructed to fit and retain retaining notches 1406 when abutment occurs. In this embodiment, retaining notches 1406 and 1408 are formed similar to that of well-known ratchet teeth. When engaged, retaining notches 1404 and 1406 prevent removal of antenna cap 1300 after seating.

FIG. 15 shows a lanyard 1504 and a bottom plan view of a portion of radiotelephone 100. Radiotelephone 100 includes a lanyard bail 1500 and a slot 1502 defined by bottom housing 108 on an end 1510. In the closed position, end 1510 forms a top end of radiotelephone 100. Lanyard 1504, which typically includes a rope made from a canvas or other suitable material, is attachable to lanyard bail 1500 and has a closed end for carrying radiotelephone 100. Lanyard 1504 may be referred to as a wriststrap cable.

Lanyard bail 1500 is slidably movable to an extended position and a retracted position relative to bottom housing 108. In the embodiment shown, lanyard bail 1500 is movable in directions along a y-axis 1506 but not in directions along an x-axis 1508, and has a retracted position shown by solid lines of lanyard bail 1500 and an extended position shown by dashed lines of a lanyard bail 1500'.

Figure 16:
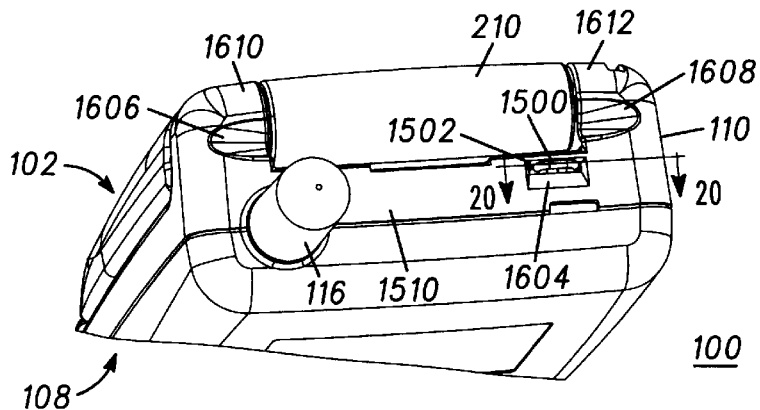
FIG. 16 is a top, rear, perspective view of a portion of the radiotelephone showing the lanyard bail in the retracted position.

FIG. 16 is a top, rear, perspective view of a portion of radiotelephone 100, showing lanyard bail 1500 positioned in the retracted position and a chamfer 1604 defined in bottom housing 108 along an outer surface thereof and an edge of slot 1502. Chamfer 1604 provides additional room to catch lanyard bail 1500 when it is in the retracted position. Thus, while being positioned out of the way when not in use, lanyard bail 1500 is easily catchable and extendible using a fingertip or a pinned instrument.

Figure 17:
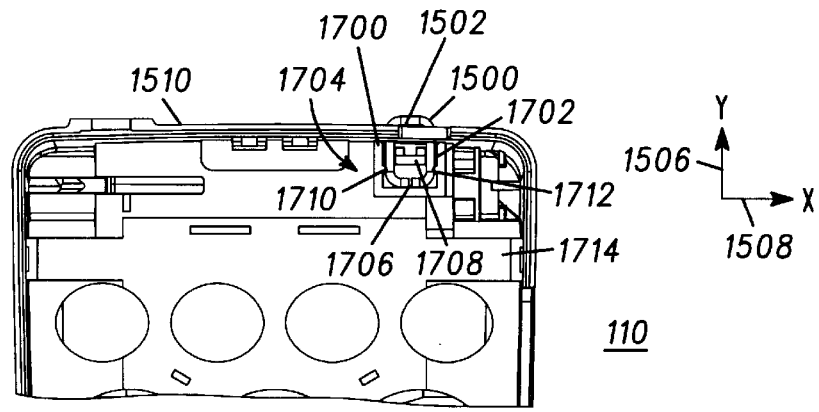
FIG. 17 is a rear plan view of a front portion of a bottom housing of the radiotelephone.

FIG. 17 is a rear plan view of a portion of front portion 110 of bottom housing 108. Front portion 110 has an inner surface 1714 defining a guide rail 1700, a guide rail 1702, a stop rib 1706, a stop rib 1708, a retention rib 1710, and a retention rib 1712. Such elements are formed from the same material as front portion 110, namely, a plastic or polycarbonate blend material, and are located within bottom housing 108 on an inside not visible to a user of radiotelephone 100. Guide rails 1700 and 1702 are substantially parallel to each other and form a track 1704 having a first end that is open and leading to slot 1502. Stop rib 1706 is positioned at a second end of track 1704 and stop rib 1708 is positioned within a center of track 1704 in between guide rails 1700 and 1702. Retention rib 1710 protrudes from guide rail 1700 within track 1704 and, likewise, retention rib 1712 protrudes from guide rail 1702 within track 1704.

Lanyard bail 1500 is made from a durable material, preferably a metal such as stainless steel. In the embodiment shown, lanyard bail 1500 is a rod formed into a substantially rectangular configuration having a length of about 5.6 mm and a width of about 4.2 mm, where the rod has a diameter of about 0.71 mm. Here, lanyard bail 1500 may be referred to as a lanyard ring, which defines a hole through which lanyard 1504 (FIG. 15) may be inserted and linked or tied to lanyard bail 1500. A small gap is provided where ends of the rod meet.

Lanyard bail 1500 is disposed within track 1704 between guide rails 1700 and 1702 around stop rib 1708. Guide rails 1700 and 1702 are sufficiently spaced to provide a close fit for lanyard bail 1500 within track 1704. Thus, lanyard bail 1500 is captured in between guide rails 1700 and 1702 and stop ribs 1706 and 1708, and is movable in directions along y-axis 1506 but not in directions along x-axis 1508. When pushed downwards toward the retracted position, lanyard bail 1500 abuts stop rib 1706 (as shown in FIG. 17). When pulled upwards toward the extended position, lanyard bail 1500 abuts stop rib 1708.

In the embodiment shown, guide rails 1700 and 1702 each have a length of about 3.7 mm and provide a spacing therebetween of about 4.5 mm (slightly greater than the width of lanyard bail 1500). Retention ribs 1710 and 1712 provide a spacing therebetween of about 3.8 mm (slightly less than the width of lanyard bail 1500). Stop rib 1708 has a length of about 2.5 mm and provides a spacing of about 1.9 mm from stop rib 1706, allowing a travel length of about 1.2 mm for lanyard bail 1500. Guide rails 1700 and 1702, stop ribs 1706 and 1708, and retention ribs 1710 and 1712 each have substantially the same heights from inner surface 1714, which is substantially the same as the diameter of the rod of lanyard bail 1500, about 0.75 mm.

Figure 18:
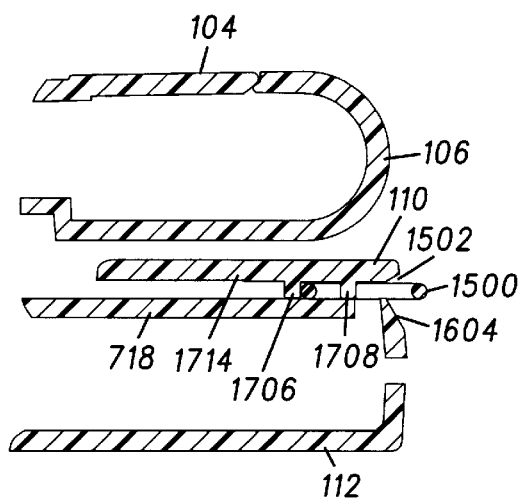
FIG. 18 is a cross section view taken along a line 18—18 of FIG. 15, showing the lanyard bail in the retracted position.
Figure 19:
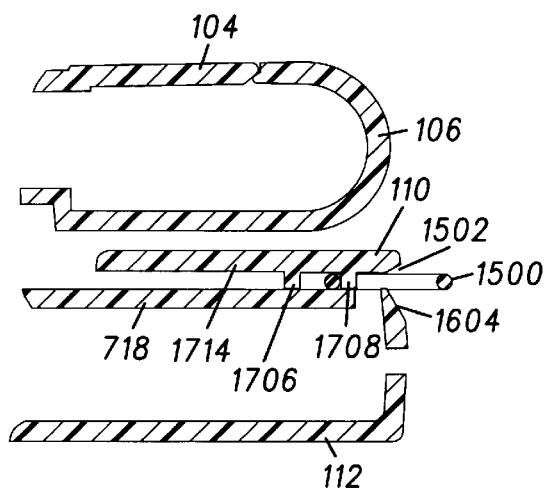
FIG. 19 is the cross section view taken along the line 18—18 of FIG. 16, showing the lanyard bail in the extended position.

FIGS. 18 and 19 are cross section views of radiotelephone 100 taken along a line 18–18' of FIG. 15, showing lanyard bail 1500 in the retracted position and the extended position, respectively. As shown, a portion of lanyard bail 1500 is captured between stop ribs 1706 and 1708, and between inner surface 1714 of front portion 110 and logic board 718. Logic board 718 includes a substrate or a printed circuit board (PCB) disposed in bottom housing 108. For assembly, before logic board 718 is disposed in front portion 110, lanyard bail 1500 is inserted through slot 1502 from the inside of front portion 110 over and around stop rib 1708. After such insertion, logic board 718 is disposed in front portion 110 and abuts a top of track 1704, thereby capturing lanyard bail 1500 therein. Back portion 112 is secured to front portion 110 and retains logic board 718 against track 1704.

Figure 20:
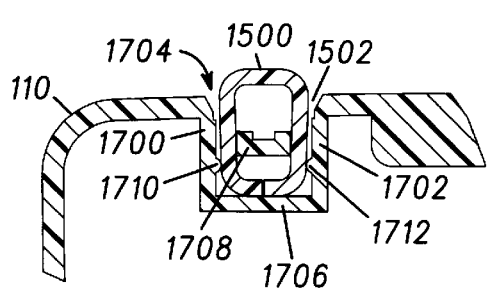
FIG. 20 is a cross section view taken along a line 20—20 of FIG. 16, showing the lanyard bail in the retracted position.
Figure 21:
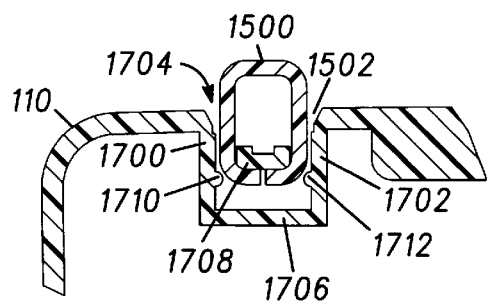
FIG. 21 is the cross section view taken along the line 20—20 of FIG. 16, showing the lanyard bail in the extended position.

FIGS. 20 and 21 are cross section views of front portion 110 and lanyard bail 1500 taken along a line 20–20' of FIG. 16, showing lanyard bail 1500 in the retracted position and the extended position, respectively. As shown in FIG. 20, retention ribs 1710 and 1712 assist in providing lanyard bail 1500 with a press fit within track 1704 in the retracted position. Here, lanyard bail 1500 gives around retention ribs 1710 and 1712 and slightly compresses where the gap becomes smaller. Thus, lanyard bail 1500 is retained or held in the retracted position when relatively small forces are applied thereto. For example, lanyard bail 1500 is retained by retention ribs 1710 and 1712 in the retracted position when radiotelephone 100 is positioned upside-down.

As shown in FIG. 21, retention ribs 1710 and 1712 are sized and positioned to provide sufficient support to carry lanyard bail 1500 in the extended position. Thus, lanyard bail 1500 is retained or held in the extended position when relatively small forces are applied thereto. For example, lanyard bail 1500 is supported in the extended position by retention ribs 1710 and 1712 when radiotelephone 100 is positioned right-side-up.

Thus, while lanyard bail 1500 has a sufficient pliability to allow for movement in the extended and retracted positions in response to relatively large forces (such as those applied by a human finger), lanyard bail 1500 and retention ribs 1710 and 1712 have a sufficient stiffness to provide retention and support in response to relatively weak forces (such as gravitational forces). That is, lanyard bail 1500 has moderately fixed or retained positions in both the retracted and extended positions.

Some additional spacing is provided such that lanyard bail 1500 may not make contact with retention ribs 1710 and 1712 when fully extended. For example, lanyard bail 1500 may not make contact with retention ribs 1710 and 1712 when lanyard 1504 is attached to lanyard bail 1500 and radiotelephone 100 is being carried by lanyard 1504. Here, lanyard bail 1500 is in complete abutment with stop rib 1708.

In this embodiment, when lanyard bail 1500 is in the retracted position, a gap of about 1.2 mm exists between a top end of lanyard bail 1500 and end 1510. Thus, although lanyard bail 1500 is substantially flush with end 1510, it is not completely flush therewith. For catching lanyard bail 1500, a gap of about 1.1 mm exists between an underside of lanyard bail 1500 and chamfer 1604. A substantial portion of lanyard bail 1500 is disposed in bottom housing 108 and hidden from view when in the retracted position. When lanyard bail 1500 is in the extended position, a gap of about 1.6 mm exists between the underside of lanyard bail 1500 and end 1510, and a gap of about 2.3 mm exists between the underside of lanyard bail 1500 and chamfer 1604.

Lanyard bail 1500 may vary in shape (U-shape, a horseshoe-shape, triangle-shape, etc.) with an accommodating construction of a housing. It is also understood that lanyard bail 1500 may vary in movement (providing partial rotation, etc.). Lanyard bail 1500 and stop ribs 1706 and 1708 may be sized and positioned such that lanyard bail 1500 is completely flush with end 1510. Finally, such apparatus may be incorporated into any electronic device or communication device such as a pager or radio.

Figure 23:
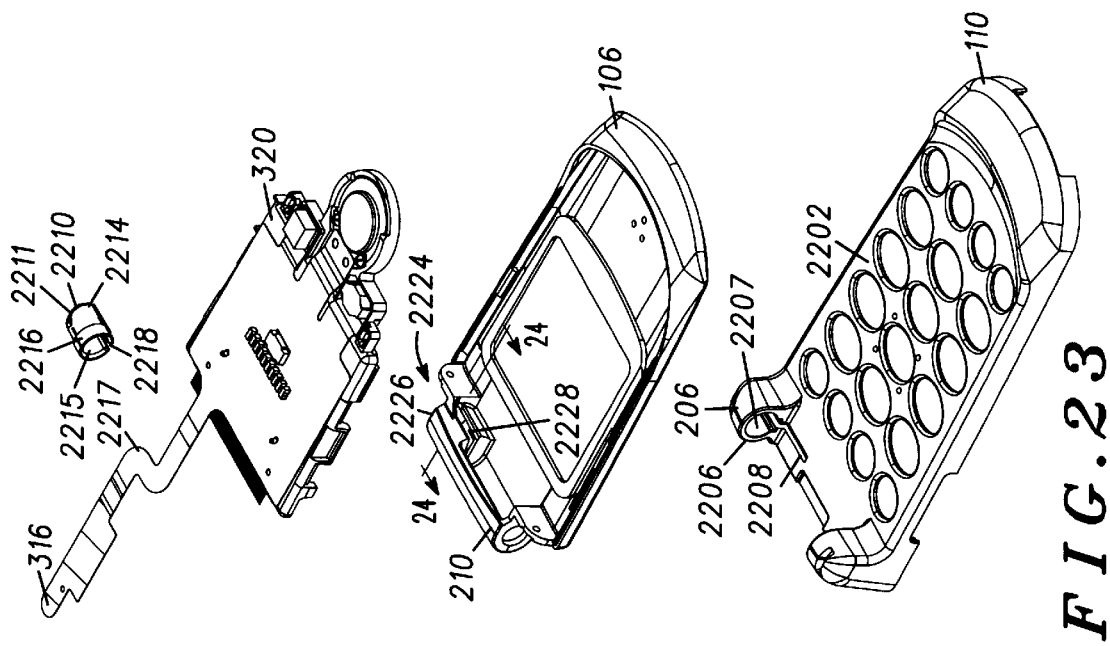
FIG. 23 is a second exploded view of the portion of the radiotelephone of FIG. 22.
Figure 22:
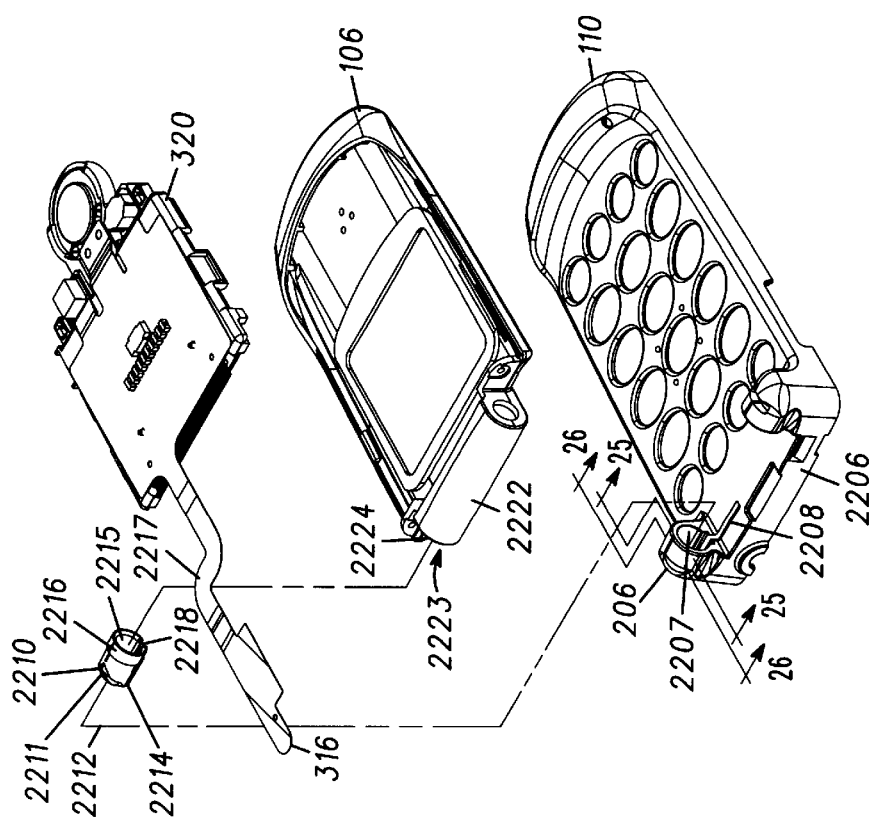
FIG. 22 is a first exploded view of a portion of the radiotelephone of FIG. 1.

Referring now to FIG. 22 and FIG. 23, a flexible circuit element 316 is routed between the top housing 102 and the bottom housing 108. The bottom housing 108 is a first housing containing first electronic circuitry, including the transmitter, receiver and controller. The bottom housing 108 has a front surface 2202 and a first knuckle 206 disposed on the front surface 2202 at one end 2206. The front surface 2202 defines a first hinge aperture 2207. In the illustrated embodiment, the first hinge aperture 2207 is the inner bore of the first knuckle 206. The front surface 2202 defines a slot 2208 adjacent the first hinge aperture 2207. The first knuckle 206 forms a first hinge portion having a slot.

A shaft 2210 extends from the bottom housing 108 at the first knuckle 2210 along an axis 2212. The shaft 2210 includes a barrel 2214 defining a bore 2215 and a bearing surface 2216. The barrel 2214 is sized for insertion in the first hinge aperture 2207. The shaft 2210 defines a shaft slot 2218 on one side of the shaft 2210. The shaft slot 2218 extends along a side of the barrel 2214 a distance sufficient to permit insertion of the flexible circuit element 316 through the shaft slot during assembly of the bottom housing 108 and the top housing 102.

In the illustrated embodiment, the shaft 2210 and the bottom housing 108 are separate elements. In alternative embodiments, bottom housing 108 and the shaft 2210 are molded in a single assembly. Unitary assembly provides the advantage of reducing parts count and simplifying assembly. In either embodiment, the bearing surface 2216 is a slotted bearing surface, including a slot suitable to receive a portion of the flexible circuit element 316 during assembly.

The shaft 2210 has a distal end 2211 having a curved outer surface. The bore 2215 has a distal end within the shaft 2210 having a corresponding curved inner surface. The inner surface curves in a radius and contour to match a shoulder 2217 of the flexible circuit element 316 after the flexible circuit element 316 has been inserted in the shaft slot 2218 and is retained in the bore 2215. By curving the inner surface to conform to the shape of the flex, the required length of bore 2215 and thus the length of the shaft 2210 are minimized. This reduces the necessary width of the radiotelephone and helps to produce a smaller, more portable product.

The top housing 102 is a second housing containing second electronic circuitry, such as the display 346 and the speaker 342. The top housing 102 includes a second knuckle 2220 aligned with the first knuckle 206 and the shaft 2210 for rotation about the axis 2212. The second knuckle 2220 forms a second hinge portion and together with the first knuckle forms a hinge. One side 2222 of the second knuckle 2220 defines a second hinge aperture 2223 and has an open end 2224. The second knuckle 2220 defines an inner rotation surface 2226 which pivotably engages the bearing surface 2218 of the shaft 2210. The shaft 2210 is sized for insertion in the second hinge aperture 2223. The second knuckle 2220 defines a second knuckle slot 2228 proximate the second electronic circuitry. The second knuckle slot 2228 has a slot width. The inner rotation surface 2226 pivots or rotates on the bearing surface 2216 as the top housing 102 moves in relation to the bottom housing 108.

The shaft slot 2218 aligns with the slot 2208 in the bottom housing 108 for routing the flexible circuit element 316 between the bottom housing 108 and the top housing 102. The flexible circuit element 316, coupling the first electronic circuitry and the second electronic circuitry, is routed from the top housing 102 through the second knuckle slot 2228, through the open end 2224 of the second knuckle 2220 and through the shaft slot 2218 and the slot 2208 to the bottom housing 108. In one embodiment, to route the flexible circuit element 316 between the movable housing elements, the top housing 102 is assembled by inserting the flexible circuit element 316 in the aperture or second knuckle slot 2228 with the flexible circuit element 316 extending from the open end 2224 of the second knuckle 2220. The flexible circuit element is extended through the slotted bearing surface of bearing surface 2216 and the bore 2215 of the shaft 2210 and through the slot 2208. Finally, the shaft 2210 is positioned in the second hinge aperture 2223 so that the inner rotation surface 2226 engages the bearing surface 2216.

This structure thus provides a stationary bearing surface for the top housing 102 to pivot around. It further provides a stationary element, the shaft, for the flexible circuit element to feed through between top and bottom housings. The shaft limits movement of the flexible circuit element and eliminates external exposure of the flexible circuit element. This prevents damage or contamination of the flexible circuit element. Moreover, hiding the bearing surface, slot, shaft and routing of the flexible circuit within the hinge improves the external appearance of the radiotelephone 100 and gives a more finished look. Also, parts count and thus manufacturing cost is reduced over previous designs that used separate components for flex routing and for a bearing surface.

Figure 26:
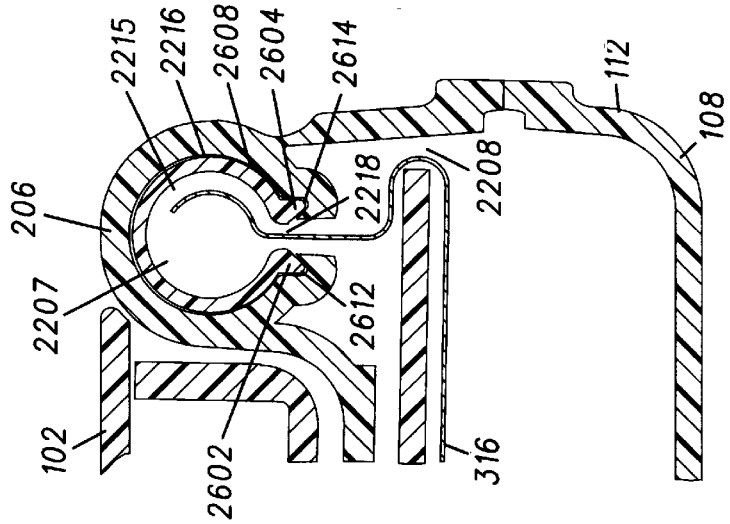
FIG. 26 is a cross sectional view taken along line 26—26 of FIG. 22.
Figure 25:
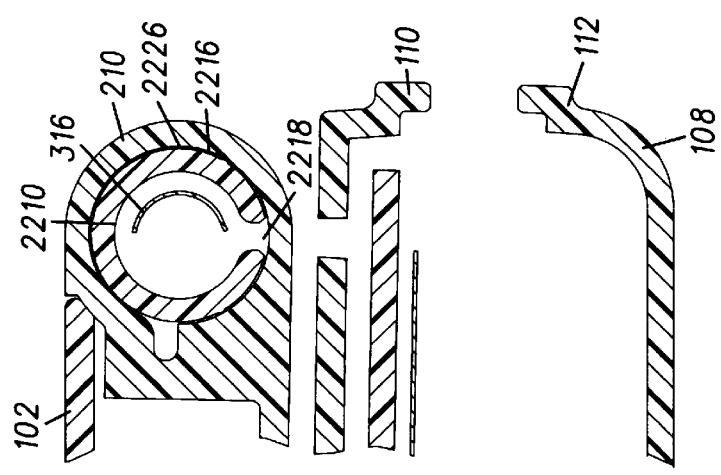
FIG. 25 is a cross sectional view taken along line 25—25 of FIG. 22.
Figure 24:
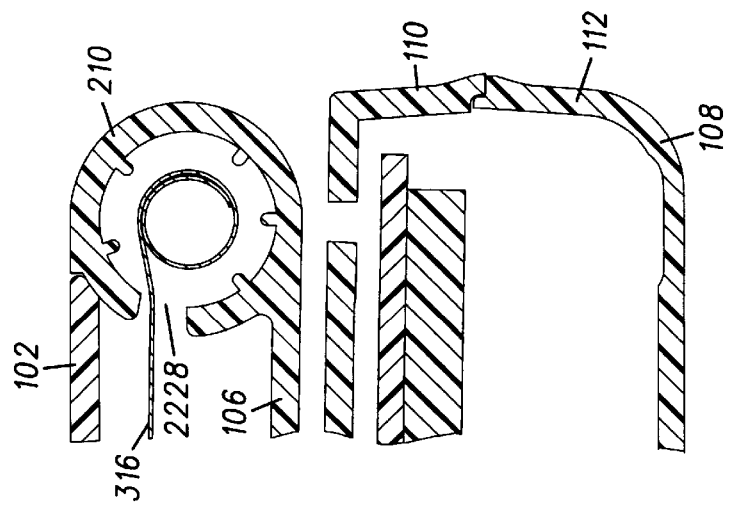
FIG. 24 is a cross sectional view taken along line 24—24 of FIG. 23.

FIG. 24 is a cross sectional view along line 24–24' in FIG. 23. FIG. 25 is a cross sectional view along lines 25–25' in FIG. 22. FIG. 26 is a cross sectional view along line 26–26' in FIG. 22. These figures illustrate routing of the flexible circuit element 316 between the top housing 102 and the bottom housing 108. In FIG. 24, the flexible circuit element 316 extends through the second knuckle slot 2228 and turns 540° within the second hinge aperture 2223. In other applications, the turns may be omitted in favor of a straight, uncurled run of flexible circuit element 316. In FIG. 25, the bearing surface 2216 engages the inner rotation surface 2226. The shaft slot 2218 is visible in the slotted bearing surface of the shaft 2210. In FIG. 26, the shaft 2210 is inserted in the first knuckle 206 and the flexible circuit element 316 extends from the bore 2215 of the shaft 2210 through the shaft slot 2218 and the slot 2208 into the bottom housing 108.

FIG. 25 also shows a notch 2506 formed in the top housing 102. Notch 2506 increases the slot width of the second knuckle slot 2228 to facilitate insertion and routing of the flexible circuit element 316.

In accordance with the present invention, the shaft 2210 includes a first set of retention features and the first hinge aperture 2207 includes a second set of corresponding retention features configured for engagement by the first set of retention features to prevent radial deformation of the shaft 2210. In FIG. 26, the first set of retention features includes one or more ribs such as rib 2602 and rib 2604 disposed on the outer surface 2608 of the shaft 2210. The second set of corresponding retention features includes one or more grooves such as groove 2612 and groove 2614 on the inner surface 2616 of the first hinge aperture 2207. The ribs engage the grooves to prevent radial deformation. The ribs hold the shaft slot 2218 open and prevent the shaft 2210 from pinching the flexible circuit element 316. Preferably, at the bearing surface 2216, the ribs abut the top housing 102 which prevents the shaft 2210 from coming out of the first hinge aperture 2207.

In another embodiment, other ribs may be added to the outer surface of the shaft 2210 to create a slight pressure fit of the shaft 2210 into the first knuckle 206. The pressure fit serves to hold the shaft 2210 in place during the assembly steps of feeding the flex through the shaft 2210.

Figure 27:
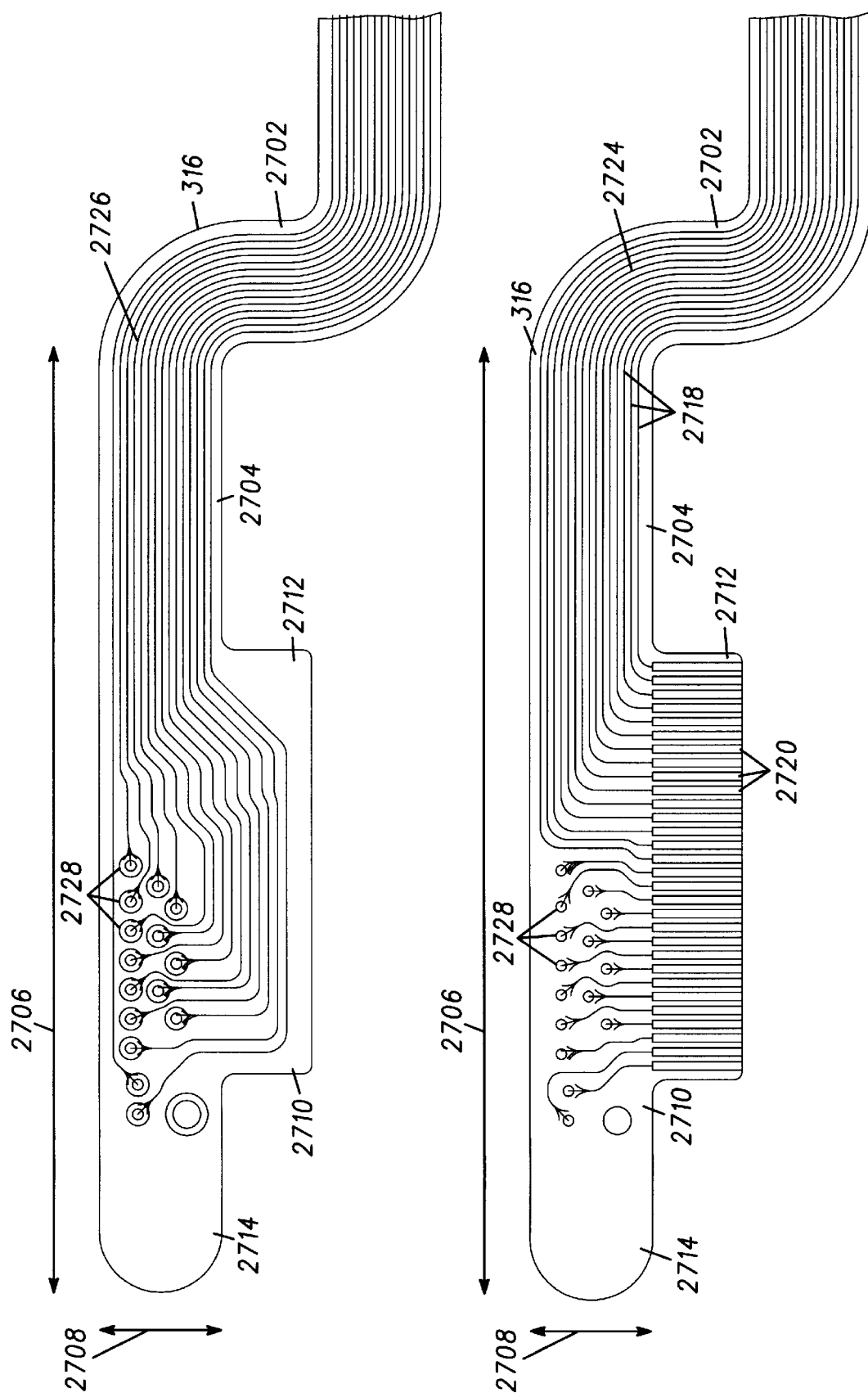
FIG. 27 shows obverse and reverse plan views of a flexible circuit element for use with the present invention.

In accordance with the present invention, the flexible circuit element 316 is adapted for easy routing between the top housing 102 and the bottom housing 108. FIG. 27 illustrates a portion of the flexible circuit element 316. The flexible circuit element 316 is also commonly referred to as a flex strip or flex.

The flexible circuit element 316 includes a flexible substrate 2702 having a body 2704. The body 2704 has a length 2706 and a width 2708. The substrate is formed of polyamide, plastic or any other suitable material having good dielectric properties as well as flexibility and resilience. The flexible circuit element 316 further includes a termination portion 2710 including a tab 2712 extending from the body 2704, as well as a leader 2714 extending from the body 2704.

For conveying electrical signals, the flexible circuit element 316 includes a plurality of conductors 2718 disposed on the flexible substrate 2702 and routed in a direction along the length 2706 of the body 2704. The conductors are also referred to as traces. The width and spacing of the conductors is controlled by manufacturing tolerances for the flexible circuit element. Typical values for the width and pitch are 0.005 inches for conductors carrying digital electronic signals and power and ground.

The flexible circuit element 316 also includes a plurality of termination pads 2720 disposed on the tab 2712 for electrical connection between the plurality of conductors 2718 and a connector. The connector is needed to form an electrical connection between the conductors 2718 of the flexible circuit element 316 and circuitry on a printed wiring board.

For example, in an electronic device such as the radiotelephone 100, the electronic device includes a first housing such as bottom housing 108 containing first operational circuitry and a second housing such as top housing 102 containing second operational circuitry. The first operational circuitry includes for example a transmitter, a receiver, a processor or other controller, a memory and a battery to power the electronic device. The second electronic circuitry includes example a display 346 and a speaker 342. The electronic device further includes a joint element such as a hinge which movably joins the first housing and the second housing. The joint element defines a slot 2208 (FIG. 22) having a slot width. The flexible circuit element 316 is routed between the top housing 102 and the bottom housing 108 in part by passing through the slot 2208.

Referring to FIG. 28 and FIG. 29, a connector 2802 is associated with the first operational circuitry 2804, which includes a printed wiring board 2806. The connector 2802 defines a coupling aperture 2806 and includes a plurality of pins 2812 for mounting on the printed wiring board and a like plurality of connection pads 2814 disposed in the coupling aperture 2806. To reduce the size of the connector 2802, and the electronic device using the connector 2802, the plurality of pins and the plurality of connection pads are spaced to minimize width of the connector. The width and spacing of the pins and the connection pads is determined by manufacturing tolerances of the connector 2802. The coupling aperture 2806 has a predetermined engagement depth which corresponds to the length of the tab 2712 of the flexible circuit element 316. A typical value for the engagement depth is 3 mm.

The connector 2802 is configured to receive and retain a flex strip such as flexible circuit element 316. The connector 2802 includes a cover 2818 movable between an open position (FIG. 28) and a closed position (FIG. 29) for retaining the flexible circuit element 316. During assembly of the radiotelephone 100, the flexible circuit element is routed through the slot 2208, the tab 2712 is inserted in the coupling aperture 2806 and the cover 2818 is closed, retaining the tab 2712 in the connector 2802. The tab 2712 is configured for mechanical engagement with the coupling aperture 2806. That is, the tab 2712 has a width and length suitable for insertion and retention in the coupling aperture 2806, and the plurality of termination pads 2720 disposed on the tab are sized and spaced for reliable electrical connection with the connection pads 2814 disposed in the coupling aperture 2806.

For routing the flexible circuit element 316 between the top housing 102 and the bottom housing 108, the flexible circuit element 316 must be passed through the second knuckle slot 2228 and the slot 2208. The leader 2714 is conveniently inserted first in the second knuckle slot 2228 and the slot 2208 and pulled through from the other side. Also to permit routing the flexible circuit element 316 through the second knuckle slot 2228 and the slot 2208, the flexible circuit element 316 has a maximum width 2826 less than the slot width of either the second knuckle slot 2228 or the slot 2208.

To minimize the maximum width 2826 of the flexible circuit element 316, the termination pads 2720 are oriented substantially normally to the conductors 2718 of the flexible circuit element. By orienting the tab 2712 and the termination pads 2720 at a right angle to the conductors 2718, the maximum width 2826 of the flexible circuit element 316 is reduced to the tab length plus the width necessary to dispose the desired number of traces, conductors 2718, on the substrate 2702. The tab length corresponds to the engagement depth for the connector 2802 or any other PWB wiring apparatus. The spacing necessary for the conductors 2718 is set by the manufacturing tolerances for the flex strip. Thus, the width of the flexible circuit element 316 is minimized. This is important because the slot width of the slot 2208 is set to be large enough to accommodate routing of the flexible circuit element 316 through the slot 2208. If the width of the flex is minimum, the slot width, too is minimum, so that the size of the radiotelephone 100 is minimized to the extent that its width is controlled by the need to route the flexible circuit element between housings.

While a ninety degree angle has been chosen in the illustrated embodiment, other suitable angles may be chosen. The goal is to dispose the conductors 2718 on the flexible substrate 2702 to minimize the width of the body 2704 of the flexible circuit element. Previous designs have used a fan out technique in which the conductors run along the length of a flex strip and are routed to termination pads disposed at the end of the flex strip along a widened section. As can be seen in FIG. 27, the width necessary to place a given number of termination pads at the ends of the flex strip is considerably greater than the width necessary to place the same number of conductors along the body of the flex.

In the illustrated embodiment, the flexible circuit element 316 has a first side 2724 and a second side 2726 and the plurality of conductors 2718 is disposed on both the first side 2724 and the second side 2726. Also in the illustrated embodiment, the plurality of termination pads 2720 is disposed only on the first side 2724. The flexible circuit element 316 further includes a plurality of vias 2728 extending through the flexible circuit element 316 to electrically couple conductors on the second side 2726 to termination pads on the first side 2724. In alternative embodiments, the plurality of conductors 2718 and the plurality of termination pads 2720 are disposed on both the first side 2724 and the second side 2726. In still other alternative embodiments, more than two layers of conductors may be disposed on the flex strip.

Referring now to FIG. 30, FIG. 31, FIG. 32 and FIG. 33, a switch assembly 3100 includes a first switch 3102, a second switch 3104, a third switch 3106, a rocker actuator 3108 and a selector actuator 3110. The first switch 3102, the second switch 3104 and the third switch 3106 are preferably substantially identical single pole, single throw momentary switches. These switches are manually actuated by moving the rocker actuator 3108 and the selector actuator 3110.

The first switch 3102 includes a body 3112, first tactile actuator 3114 and a mounting pad 3116. The body 3112 contains the switch components. The first tactile actuator 3114 actuates the switch when the first tactile actuator 3114 is depressed or otherwise translated. In the illustrated embodiment, depressing the first tactile actuator 3114 momentarily closes the first switch 3102, completing an electrical connection. The body includes a bias element such as a spring which biases the first tactile actuator 3114 outward, to the normally open position. The first switch 3102 may be of the normally closed type or any other suitable type of switch. The mounting pad 3116 provides a convenient surface for surface mounting the first switch 3102. The mounting pad thus includes an electrical contact area 3118 and an electrical contact area 3120 for electrically contacting a printed circuit board 3122.

The second switch 3104 includes a body 3128, a second tactile actuator 3130 and a mounting pad 3132. The third switch 3106 includes a body 3136, a third tactile actuator 3138 and a mounting pad 3140. As noted, the switches in the illustrated embodiment are substantially identical and are standard, off the shelf components. A suitable off the shelf switch is the KSS miniature side actuated tact switch for SMT (surface mount technology), available from ITT Schadow, Inc., located in Eden Prairie, Minn. Other switches may be substituted. Use of off the shelf switches, rather than custom designed switches, reduces the cost of the switches of the switch assembly 3100, thereby reducing the overall manufacturing cost of an electronic device, such as a radiotelephone, which includes the switch assembly 3100.

To minimize the space required by the switch assembly 3100, the three switches are staggered in their placement. The second switch 3104 is disposed proximally adjacent the first switch 3102. The third switch 3106 is disposed behind the first switch 3102 and the second switch 3104. Here, behind the first switch 3102 and the second switch 3104 means that the body 3112 of the first switch and the body 128 of the second switch 3104 are located between the rocker actuator 3108 and selector actuator 3110 and the third switch 3106. Any other suitable placement of the switches so that the three switches are not linearly disposed may be used. By staggering the switch placement in this manner, the height of the switch assembly 3100 (right to left dimension in FIG. 33) is minimized. This permits reduction in size of any electronic device using the switch assembly 3100 and permits the rocker actuator 3108 and selector actuator 3110 to be easily manipulated by a single finger or thumb of one hand of a user.

The rocker actuator 3108 has a first rocker arm 3152, a second rocker arm 3154 and a center link 3156 including a post 3158. The rocker actuator 3108 is disposed adjacent to the first switch 3102 and the second switch 3104 and is configured to pivotably actuate one of the first switch 3102 and the second switch 3104. To that end, the rocker actuator is pivotable about the post 3158. The post 3158 extends from the center link 3156 and is configured for pivoting engagement with a support, such as a hole in the printed circuit board 3122.

In the illustrated embodiment, the rocker actuator 3108 includes a first finger surface 3160 and a second finger surface 3162. These finger surfaces are adapted for engagement by a finger or thumb of a user to actuate the rocker actuator 3108. The rocker actuator 3108 pivots about the post 3158 from a neutral position, illustrated in FIG. 1–FIG. 4, to a first position in response to actuation of the first rocker arm 3152 for engaging the first tactile actuator 3114 of the first switch 3102. The rocker actuator 3108 pivots about the post 3158 from the neutral position to a second position in response to actuation of the second rocker arm 3154 for engaging the second tactile actuator 3130 of the second switch 3104.

The first rocker arm 3152 includes a first engagement member 3164 positioned to engage the first tactile actuator 3114. The second rocker arm 3154 includes a second engagement member 3166 positioned to engage the second tactile actuator 3130. The first engagement member 3164 and the second engagement member 3166 are any suitable size and shape. The size and shape of the engagement members is chosen based on the desired travel of the rocker arms from the neutral position to a position in which the tactile actuator is engaged and the desired tolerance of the relative positioning of the components of the switch assembly 3100.

The selector actuator 3110 includes a body 3170 and an extension 3172. The extension 3172 terminates in a finger surface 3168. The first switch 3102 and the second switch 3104 are spaced to define a notch 3174 sized to receive the extension 3172 of the selector actuator 3110. Similarly, the first rocker arm 3152, the second rocker arm 3154 and the center link 3156 of the rocker actuator 3108 define a slot 3176 sized to receive the extension 3172 of the selector actuator 3110. The slot 3176 aligns with the notch 3174 for sliding actuation of the third switch 3106 by engaging the finger surface 3168 of the extension 3172. Thus, the selector actuator 3110 is actuated by depressing the finger surface 3168. The selector actuator 3110 slides in the notch 3174 and the slot 3176 and engages the third tactile actuator 3138. As illustrated, the selector actuator includes a third engagement member 3178 positioned to engage the third tactile actuator 3138. The size and shape of the third engagement member 3178 is selected using the same considerations described above for selecting the first engagement member 3164 and second engagement member 3166.

Since the finger surface 3168 of the selector actuator 3110 is located between the first finger surface 3160 and the second finger surface 3162 of the rocker actuator 3108, the switch assembly 3100 is particularly well suited to easy operation using only one finger or one thumb of a user's hand. While grasping an electronic device such as a radiotelephone in one hand, the rocker actuator 3108 and the selector actuator 3110 are spaced directly adjacent to each other, with no intervening space. The finger surfaces are thus also directly adjacent, allowing rapid, accurate selection and actuation of one of the switches. This improves user convenience, for example when maneuvering in a menu system or electronic phone book of a radiotelephone. This also reduces the overall size of the switch assembly 3100.

Figure 34:
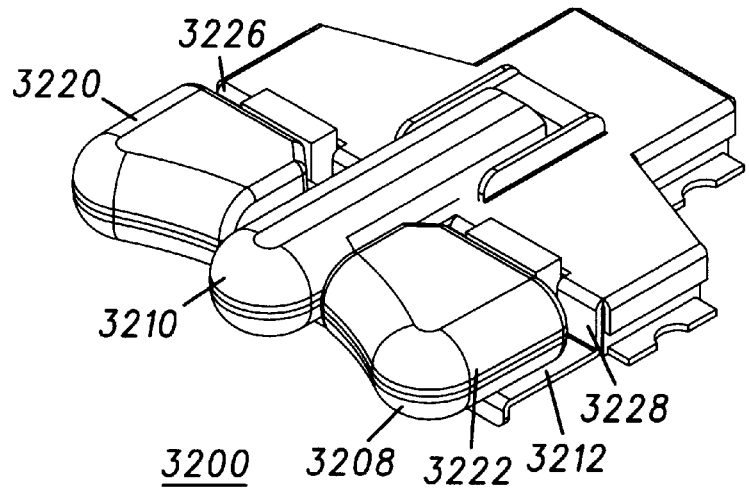
FIG. 34 is an isometric view of a second embodiment of a switch assembly for use with the radiotelephone of FIG. 1.
Figure 35:
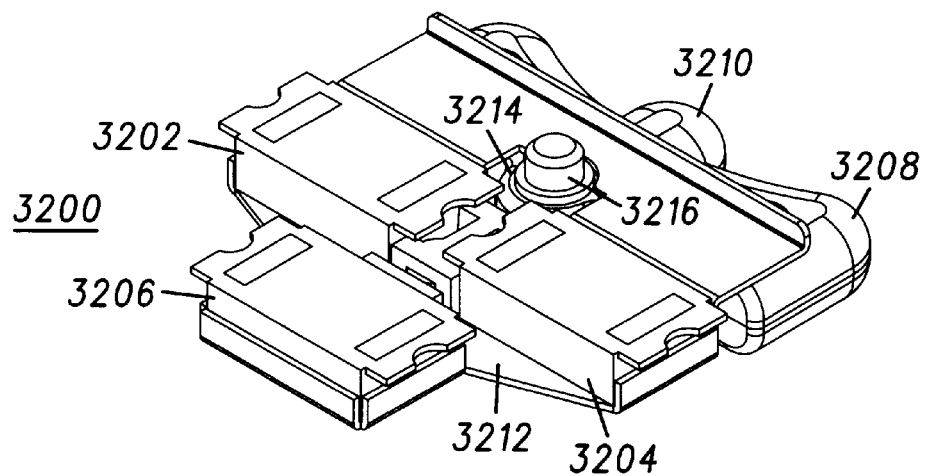
FIG. 35 is a reverse isometric view of the switch assembly of FIG. 34.
Figure 36:
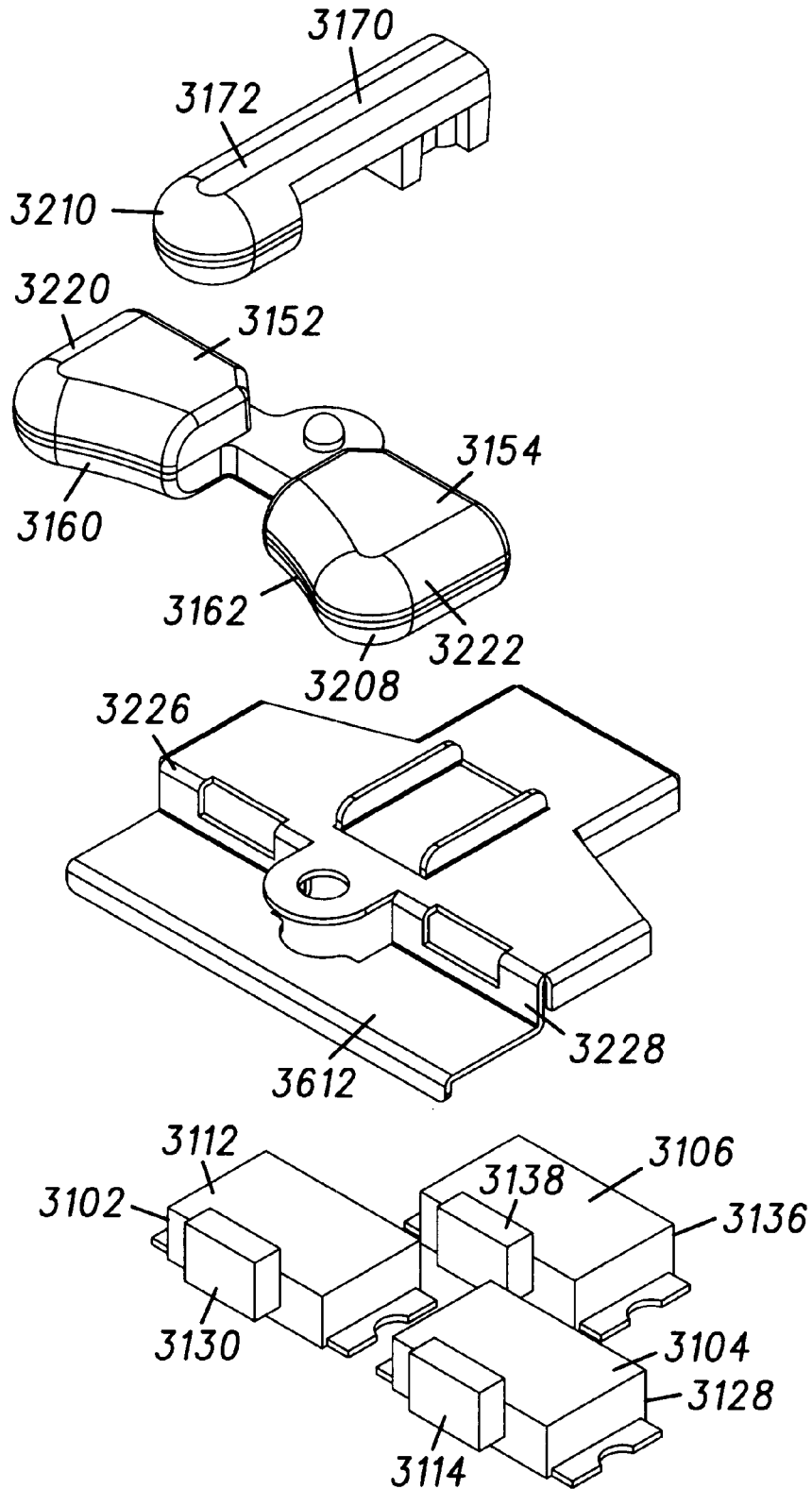
FIG. 36 is an exploded view of the switch assembly of FIG. 34.

Referring now to FIG. 34, FIG. 35 and FIG. 36, a switch assembly 3200 in accordance with a second embodiment of the present invention is shown. The switch assembly 3200 includes a first switch 3202, a second switch 3204 and a third switch 3206. The switch assembly 3200 further includes a rocker actuator 3208 and a selector actuator 3210. Construction and operation of these elements are generally the same as for the similar elements of FIG. 30–FIG. 33. illustrated in FIG. 1. Upon reception of RF signals, the radiotelephone 3704 detects the RF signals through the antenna 3706 producing detected RF signals. The receiver 3708, coupled to the antenna 3706, converts the detected RF signals into electrical baseband signals. The demodulator 3712 demodulates the electrical baseband signals and recovers the data transmitted on the RF signals and outputs the data to the controller 3714. The controller 3714 is disposed within the housing 3701 for controlling the radiotelephone 3704 including a display 346. The controller 3714 formats the data into recognizable voice or information for use by user interface 3716. The user interface 3716 communicates the received information or voice to a user. Typically, the user interface 3716 includes the display 346, a keypad 720, a speaker 342, a microphone 734 and a switch assembly 114. The radiotelephone further includes a memory 3726.

Upon transmission of radio frequency signals from the radiotelephone handset 3704 to the remote transceiver 3702, the user interface 3716 transmits user input data to the controller 3714. The controller 3714 typically includes a microprocessor, memory, clock generator and a power amplifier control circuit. The controller 3714 formats the information obtained from the user interface 3716 and conveys it to the transmitter 3710 for conversion into RF modulated signals. The transmitter 3710 conveys the RF modulated signals to the antenna 3706 for transmission to the remote transceiver 3702.

Preferably, the switch assembly 114 is of the type described above in connection with FIG. 30 and FIG. 34. The switch assembly 114 includes a scroll down button 3730, a scroll up button 3734 and a select button 3736. These buttons correspond to the rocker actuator having a first rocker arm and a second rocker arm and a select actuator, as described above. These buttons actuate a first switch, a second switch and a third switch to send appropriate electrical signals to the controller 3714. These buttons, when used in conjunction with the controller 3714, provide the described movement through a menu system or electronic phone book stored in the memory 3726.

The memory 3726 is disposed within the housing 3701 for storing and retrieving data. In particular, the memory is used for storing information forming a telephone book and for storing a menu system. The stored electronic phone book data include data representing names and associated telephone numbers and possible other information as well.

The switch assembly 3200 still further includes a bracket 3212 for retaining in fixed orientation the first switch 3202, the second switch 3204, the third switch 3206, the rocker actuator 3208 and the selector actuator 3210. The bracket 3212 retains the three tactile switches and the two actuators, allowing greater control over the tolerances of positioning the elements individually. This results in improved consistency of tactile feel when operating the switch assembly 3200. By including the bracket 3212, the total number of individual components which must be assembled to produce a completed electronic device is reduced from five (three switches and two actuators) in the embodiment of FIG. 30 to one in the embodiment of FIG. 34. This reduces manufacturing cost, waste and time. If assembly is by surface mount attachment to a printed wiring board (PWB), the entire switch assembly 3200 may be directly attached to the PWB as one component. If robotic assembly is being used, the switch assembly may be placed by a robotic tool such as a vacuum tool.

The bracket 3212 defines a hole 3214 sized to receive a post 3216 of the rocker actuator 3208. The hole 3214 partially or wholly surrounds the post 3216 so that the rocker actuator 3208 pivots about the post 3216. In this manner, the first rocker arm 3220 and the second rocker arm 3222 of the rocker actuator 3208 actuate the first switch 3202 and the second switch 3204, respectively. In the illustrated embodiment, the bracket 3212 includes a first shoulder 3226 and a second shoulder 3228 disposed to limit the travel of the first rocker arm 3220 and the second rocker arm 3222, respectively. This prevents the rocker arms from damaging the switches if the rocker actuator 3208 pressed too hard.

Figure 37:
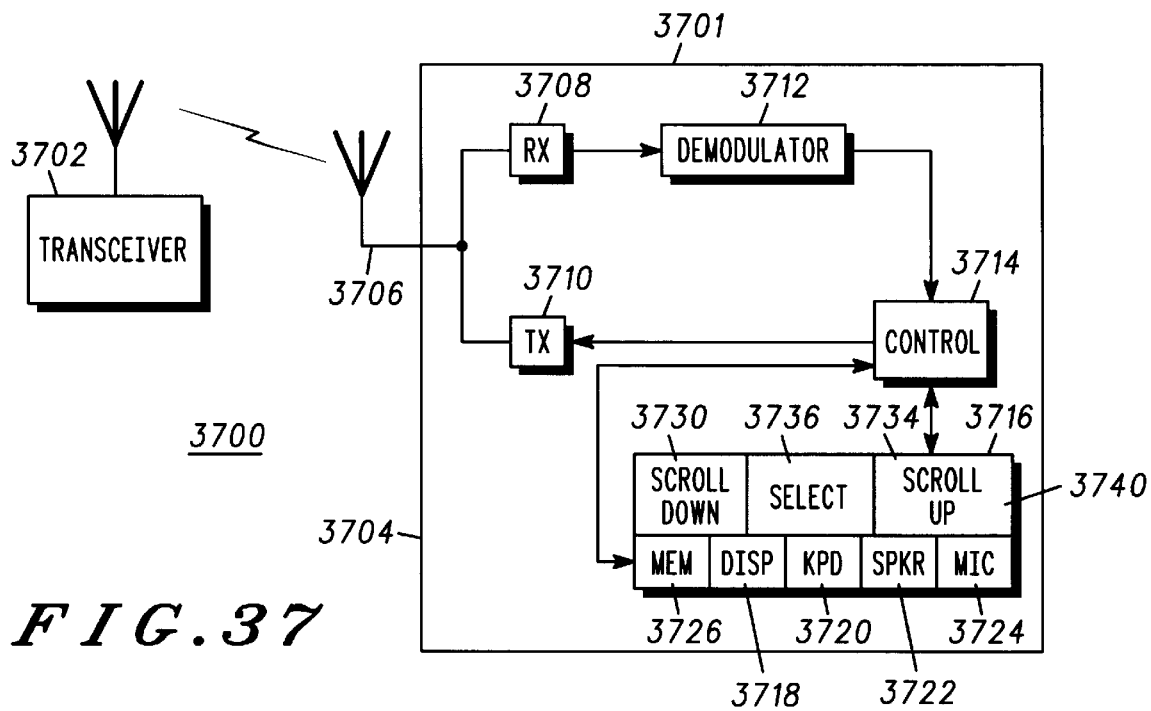
FIG. 37 is an operational block diagram of the radiotelephone of FIG. 1.

Referring now to FIG. 37, it is an illustration in block diagram form of a radiotelephone communication system 3700. The radiotelephone communication system 3700 includes a remote transceiver 3702 and one or more radiotelephones such as radiotelephone 3704. The remote transceiver 9372 sends and receives radio frequency (RF) signals to and from radiotelephones within a fixed geographic area.

The radiotelephone 3704 is one such radiotelephone contained within the geographic area, and may be of the type illustrated in FIG. 1. The radiotelephone 3704 includes an antenna 3706, a receiver 3708, a transmitter 3710, a demodulator 3712, a controller 3714 and a user interface 3716, all contained in a housing 3701. The housing 3701 may include multiple housings, such as top housing 102 and bottom housing 108 The data are entered using the keypad 720. The data are displayed on the display 346, both during entry and during subsequent use of the phone book. The memory 3726 may be searched for previously stored data by entering search elements or symbols from the keypad 720.

In accordance with the present invention, the controller 3714 responds to the actuations of the rocker actuator and the selector actuator to control storage of data in the memory 3726 and display of data in the display 346. The controller is typically a microprocessor or microcontroller which operates responsive to stored program instructions or software. The switch actuations are interpreted in accordance with definitions maintained in the software and may be customized to particular applications, such as a menu system or electronic phone book.

Figure 39:
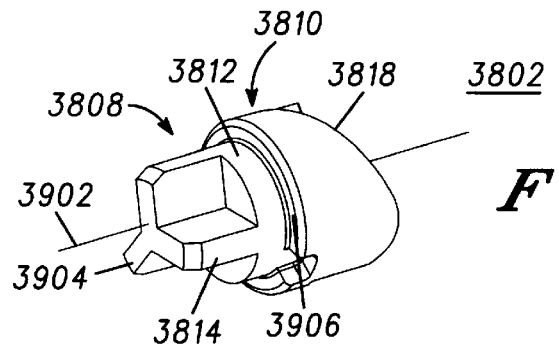
FIG. 39 is a perspective view of a cam of the hinge of FIG. 38.
Figure 38:
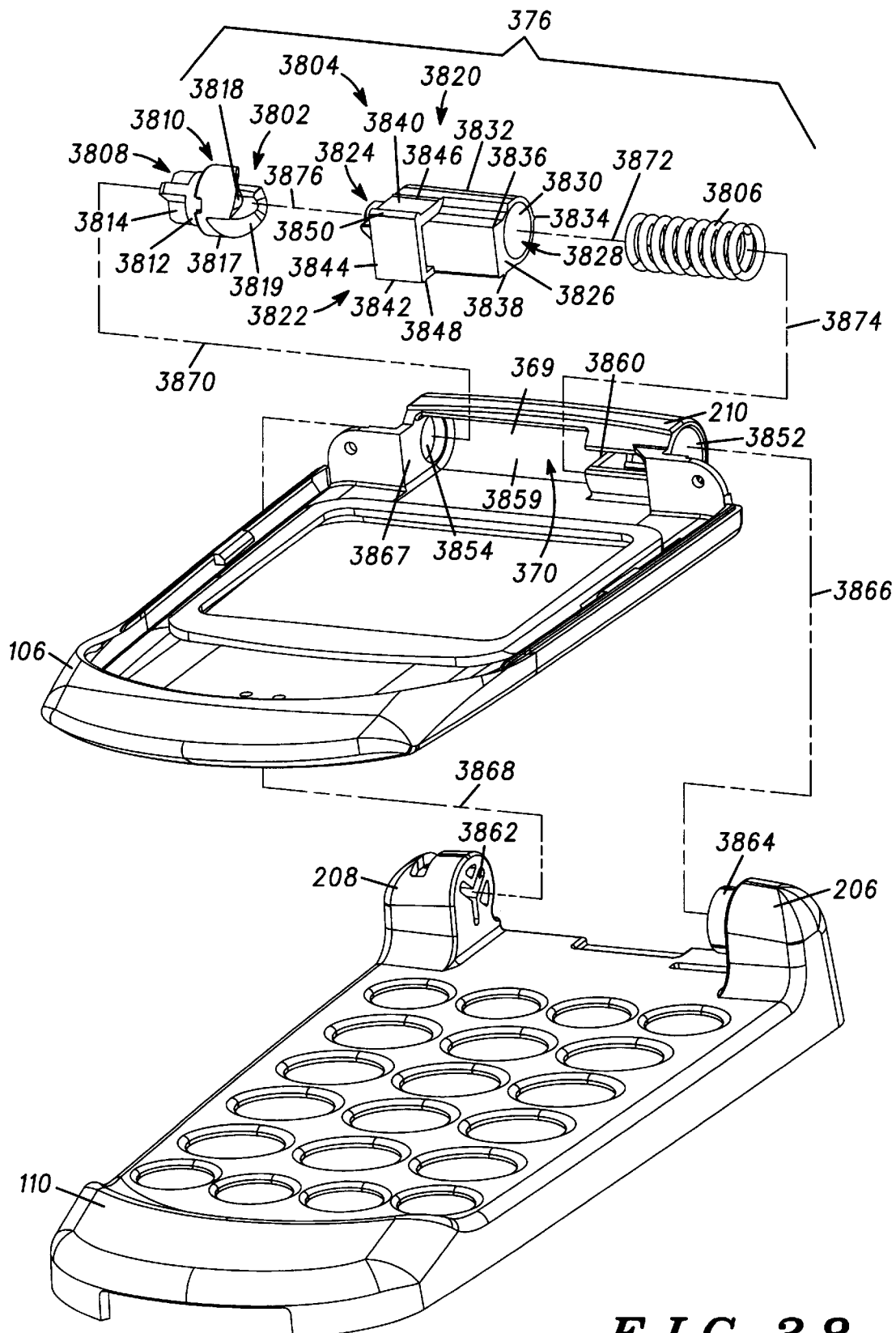
FIG. 38 is an exploded, fragmentary, perspective view of the radiotelephone of FIG. 1 further illustrating the hinge.

Referring now to FIG. 38, a hinge 376, when assembled, joins front portion 106 of the top housing 102 of FIG. 1 to front portion 110 of the bottom housing 108. The hinge 376 has a stationary element, which in the illustrated embodiment is a cam 3802; a movable element, which in the illustrated embodiment is a follower 3804; and a spring 3806. The cam 3802 is shown in FIGS. 38 and 39 to be generally cylindrical with a longitudinal, center axis 3902. The cam 3802 is preferably injection molded using Delrin® 100 acetal resin commercially available from DuPont, or other suitable material. The cam 3802 has two distinct integral portions joined along the axis 3902: a head 3808 and a can 3810.

Head 3808 is generally cylindrical and, in the illustrated embodiment, has a length and a diameter of approximately 4 mm. Head 3808 has a body 3812 and a prong 3814. Body 3812 is solid, disk-shaped, and coaxial to axis 3902. One end of body 3812 is contiguous with the can 3810. The other end of body 3812 is contiguous with the prong 3814. The prong 3814 is a male-type connector that is generally cylindrical with a diameter equal to that of body 3812 and triangular portions cut away to form converging surfaces perpendicular to the adjoining end of body 3812. A distal end of the prong 3814 employs a surface 3904 that defines one end of the cam 3802. In the illustrated embodiment, surface 3904 has a "Y" shape or other suitable shape, such as a "+," that maximizes surface contact with a female-type connector to prevent movement of the cam 3802 once it is assembled.

The can 3810 is generally cylindrical and hollow, closed at one end, and open at the other end. In the illustrated embodiment, the can 3810 has a length of approximately 4 mm, an outer diameter of approximately 6 mm, and an inner diameter of approximately 3 mm. At the closed end, the can 3810 has a generally flat circular surface 3906 joined to, and slightly larger in diameter than, head 3808. The open end of the can 3810 opposite head 3808 employs a profile 3817 about its periphery. The profile 3817 defines the other end of the cam 3802. The profile 3817 is formed of a pair of 180° symmetrical, contoured bearing surfaces 3818 and 3819. Bearing surfaces 3818 and 3819 are slightly angled downward and inward to minimize wear during operation of the hinge 376.

Figure 42:
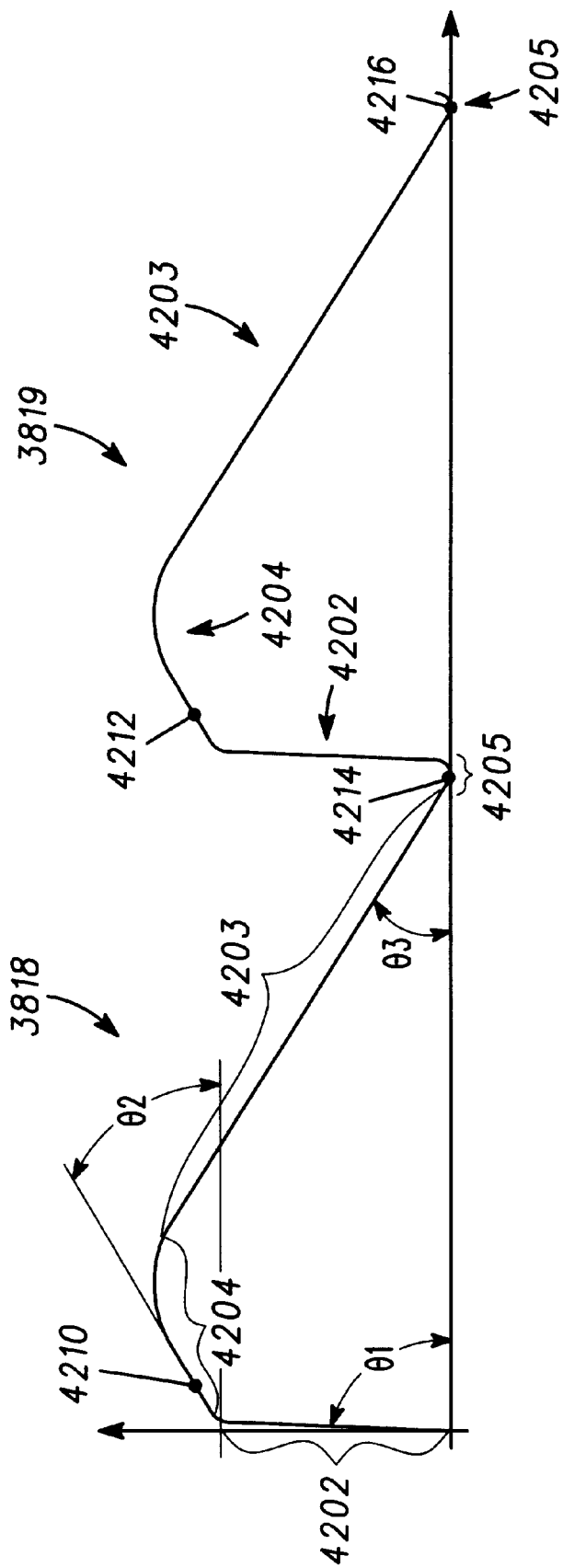
FIG. 42 is a graph illustrating a profile of the cam of FIG. 39 in two dimensions.

For clarity, the profile 3817 has been removed from the circular periphery of the open end of the can 3810 and bearing surfaces 3818 and 3819 have been mapped onto a two dimensional graph in FIG. 42, wherein the horizontal axis defines length and the vertical axis defines height. Each one of bearing surfaces 3818 and 3819 is substantially ramp shaped and includes angled segments 4202 and 4203 and curved segments 4204 and 4205. Angled segment 4202 extends upward from the horizontal axis at an angle θ1 of slightly less than 90° to join curved segment 4204. Curved segment is substantially convex and has an arm, which extends from angled segment 4202 at an angle θ2 of approximately 30° (with respect to the horizontal axis), and an arc of approximately 1 mm in radius joined on one end to the arm and joined on the other end to angled segment 4203. Angled segment 4203 extends downward from curved segment 4204 at an angle θ3 of approximately 30° (with respect to the horizontal axis) to join curved segment 4205. Curved segment 4205 is substantially concave and has an arc of approximately 0.1 mm in radius joined on one end to angled segment 4203 and joined on the other end to angled segment 4202 of bearing surface 3819.

Figure 40:
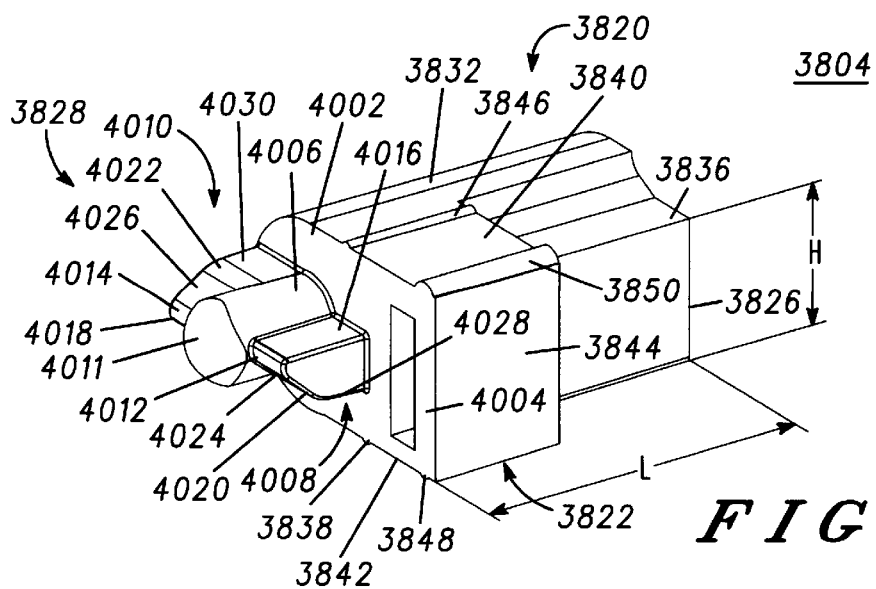
FIG. 40 is a perspective view of a follower of the hinge of FIG. 38.

The follower 3804 is shown in FIGS. 38 and 40 to be generally cylindrical. The follower 3804 is preferably injection molded from a lubricated impregnated plastic, such as Teflon impregnated nylon or other suitable fluorocarbon impregnated polymide, so as to eliminate the need for lubricating the hinge 376. The follower 3804 has three distinct integral portions: a body 3820, an arm 3822, and a head 3824.

Body 3820 is formed of a cylindrical hollow portion laterally joined on one side to a generally rectangular solid portion. In the illustrated embodiment, body 3820 has a length L of approximately 11 mm, a height H of approximately 5 mm, and a width of approximately 7 mm. One end of body 3820 is defined by a flat front surface 4002. The other end of body 3820, which is also one end of the follower 3804, is defined by a flat rear surface 3826 with a circular opening 3828 to a cylindrical interior surface 3830. In the illustrated embodiment, opening 3828 and interior surface 3830 have a diameter of approximately 4.5 mm and interior surface 3830 has a length of approximately 10 mm. The hollow portion of body 3820 has a semi-cylindrical exterior surface 3832 that extends between the front and rear surfaces 4002 and 3826 and defines top-middle, top-left, left, bottom-left, and bottom-middle sides of body 3820. A rib 3834 is formed on exterior surface 3832 along the left side of body 3820. Rib 3834 is substantially semicircular and extends the length L of body 3820 between the front and rear surfaces 4002 and 3826. The solid portion of body 3820 has interconnected flat exterior surfaces 3836 that extend between the front and rear surfaces 4002 and 3826 and define bottom-right, right, and top-right sides of body 3820. A rib 3838 is formed on exterior surfaces 3836 along the bottom-right of body 3820. Rib 3838 is substantially semicircular and extends the length L of body 3820 between the front and rear surfaces 4002 and 3826.

The arm 3822 of the follower 3804 extends laterally from the right side of body 3820. The arm 3822 is generally rectangular and has a front surface 4004 that is coplanar with front surface 4002 of body 3820 and top and bottom surfaces 3840 and 3842 extending perpendicularly rearward from front surface 4004 for a distance of approximately 4 mm in the illustrated embodiment. Top and bottom surfaces 3840 and 3842 are coplanar with exterior surface 3832 at the top-middle of body 3820 and coplanar with the one of exterior surfaces 3836 at the bottom-right side of body 3820, respectively. A right surface 3844 extending perpendicularly between front, top, and bottom surfaces 4004, 3840, and 3842 is substantially parallel to, and in the illustrated embodiment is approximately 2 mm from, the one of exterior surfaces 3832 at the right side of body 3820. A rib 3846, which is substantially semicircular, is formed on, and extends across, top surface 3840 in proximity to exterior surface 3832 at the top-middle of body 3820. A rib 3848, which is substantially semicircular, is formed on, and extends across, bottom surface 3842 in proximity to a bottom edge of right surface 3844. A rib 3850, which is substantially semicircular, is formed on, and extends across, top surface 3840 at a top edge of right surface 3844. In the illustrated embodiment, rib 3850 has a radius that is substantially larger than that of ribs 3834, 3838, 3846, and 3848. Ribs 3834, 3838, 3846, 3848, and 3850 have no draft and are employed to provides uniformity on the exterior surfaces of the follower 3804.

Head 3824 of the follower 3804 is joined to body 3820 at front surface 4002 thereof. Head 3824 has a post 4006 and fingers 4008 and 4010. The post 4006 is substantially cylindrical and, in the illustrated embodiment, has a diameter or height of approximately 2 mm and a length of approximately 4 mm. The post 4006 is joined to front surface 4002 at one end and terminates in a dome 4011 at the other end, which also defines the other end of the follower 3804. The post 4006 functions to maintain the hinge 376 in alignment with the axis of rotation 211 of FIG. 2. The post 4006 is positioned between fingers 4008 and 4010.

Fingers 4008 and 4010 are joined to front surface 4002 at one end, extend along and laterally adjoin opposite sides of the post 4006, and terminate in rounded tips 4012 and 4014, respectively, at the other end. In the illustrated embodiment, fingers 4008 and 4010 are approximately 3 mm in length. Tips 4012 and 4014 are formed from the convergence of respective planar, flat surfaces 4016 and 4018 of fingers 4008 and 4010 and opposing respective angled surfaces 4020 and 4022 of fingers 4008 and 4010. Flat surfaces 4016 and 4018 extend substantially perpendicularly from front surface 4002 to tips 4012 and 4014, respectively. Angled surfaces 4020 and 4022 extend from tips 4012 and 4014, respectively, to front surface 4002, first, at an angle of approximately 40° with respect to flat surfaces 4016 and 4018, respectively, as defined by first angle portions 4024 and 4026, respectively, and, next, at an angle slightly less than perpendicular with respect to front surface 4002, as defined by second angle portions 4028 and 4030, respectively. As such, fingers 4008 and 4010 are not symmetrical about tips 4012 and 4014. Also, in the illustrated embodiment, fingers 4008 and 4010 are 180° symmetrical across the post 4006. Regarding finger 4008, flat surface 4016 extends along the post 4006 at approximately three-fourths of the height of the post 4006 and the second angle portion 4028 of angled surface 4020 is substantially flush with a bottom of the post 4006. Regarding finger 4010, flat surface 4018 extends along the post 4006 at approximately one-fourth of the height of the post 4006 and the second angle portion 4030 of angled surface 4022 is substantially flush with a top of the post 4006.

The spring 3806 is spiral shaped with an outer diameter slightly less than the diameter of the circular opening 3828 and cylindrical interior surface 3830 of the follower 3804. In the illustrated embodiment, the spring 3806 is a compression spring composed of music wire or other suitable material having an outer diameter of approximately 4 mm, a length of approximately 16 mm, 12 coils, and a spring rate of approximately 5.6 N/mm. The ends of the spring 3806 are closed and ground (i.e., flattened) to facilitate mating once the hinge 376 is assembled.

To accommodate the hinge 376, knuckle 210 of the front portion 106 of the top housing 102 of FIG. 1 has apertures 3852, 3854, and 369 of FIG. 38 and a pocket 370. Aperture 3852, which is circular, is formed in one end of knuckle 210. In the illustrated embodiment, aperture 3852 has a diameter of approximately 6 mm and extends inward to define a cylindrical interior surface of knuckle 210 that is approximately 7 mm in length. Aperture 3854, which is circular, is formed in the other end of knuckle 210. In the illustrated embodiment, aperture 3854 has a diameter of approximately 4.5 mm and extends inward to define a ring-shaped interior surface of knuckle 210 that is approximately 1 mm in length. Aperture 369 is generally rectangular and formed in at a front of knuckle 210.

The pocket 370 resides behind aperture 369 and defines an interior surface 3859 of knuckle 210 that is slightly more than semi-cylindrical. The pocket 370 intersects with aperture 3854 on one end and is partitioned from aperture 3852 by an interior wall 3860 at the other end. In the illustrated embodiment, the pocket 370 has a diameter of approximately 6 mm and a length of approximately 17 mm. Because the diameter of the pocket 370 is slightly larger than the diameter of aperture 3854, an interior circular wall 3861 is formed in the pocket 370 around aperture 3854. The pocket 370, as well as the rest of front portion 106, is fabricated from a plastic injection molding process. To ensure uniformity in the diameter of the pocket 370, the molding tool around which the pocket 370 is formed is pulled from the pocket 370 via the aperture 369 and in a direction that is perpendicular to the axis of rotation 211. By doing so, the pocket 370 has a uniform shape, such that all cross-sections of the pocket 370 taken normal to the axis of rotation 211 would be substantially identical. The uniform shape of the pocket 370 is substantially semi-cylindrical with a slight draft angle needed for ejection of the molding tool.

To accommodate the hinge 376, knuckles 208 and 210 of the front portion 110 of the bottom housing 108 of FIG. 1 have a socket 3862 and a shaft 3864, respectively. The socket 3862 is a female-type connector formed in a surface of knuckle 208 that faces knuckle 210. In the illustrated embodiment, the socket 3862 has a depth of approximately 3 mm and is shaped to accept and secure a "Y"-shaped prong or other suitably shaped prong. The shaft 3864 is a male-type connector and is carried on a surface of knuckle 210 that faces knuckle 208. The shaft is cylindrical and, in the illustrated embodiment, has a diameter of approximately 6 mm.

Assembly of the hinge 376 to front portions 106 and 110 is described in the following with reference to FIGS. 38–40. First, the hinge 376 is assembled. The spring 3806 is inserted into the follower 3804. One end of the spring 3806 is inserted into the circular opening 3828 of body 3820 of the follower 3804, as depicted by line 3872. The cam 3802 is placed on the follower 3804. The can 3810 of the cam 3802 is placed on head 3824 of the follower 3804, as depicted by line 3876, such that the dome 4011 of the post 4006 of head 3824 inserts into the open end of the can 3810 and tips 4012 and 4014 of fingers 4008 and 4010 engage the arc of curved segment 4205 of the bearing surfaces 3818 and 3819, respectively, of the can 3810.

Next, the hinge 376 is inserted into the pocket 370 of front portion 106. The hinge 376 is positioned such that the exposed end of the spring 3806 extends into the pocket 370 via aperture 369 and engages the interior wall 3860 at approximately a 30° angle, as depicted by line 3874. Using a tool, the hinge 376 is then urged toward the interior wall 3860 to compress substantially all of the spring 3806 into body 3820 of the follower 3804. While the spring 3806 is compressed, the cam 3802 and the follower 3804 are swung into the pocket 370 via aperture 369 until exterior surface 3832 of body 3820 of the follower 3804 juxtaposes interior surface 3859 of knuckle 210 and head 3808 of the cam 3802 is positioned in the pocket 370 such that the prong 3814 is aligned with aperture 3854. Once positioned, the hinge 376 is released allowing the spring 3806 to decompress and force the prong 3814 of head 3808 of the cam 3802 through aperture 3854, as depicted by line 3870. Once installed in front portion 106, the rectangular solid portion of body 3820 of the follower 3804 and the arm 3822 of the follower 3804 reside beyond aperture 369 and outside of the pocket; and the prong 3814 of head 3808 of the cam 3802 extends from one end of knuckle 210 outside aperture 3854, body 3812 of head 3808 of the cam 3802 resides against the interior surface formed by aperture 3854, and the can 3810 of the cam 3802 resides in the pocket 370 with surface 3906 abutting the interior circular wall 3861 of the pocket 370.

Finally, front portion 106 is attached to front portion 110. Front portion 106 is attached to front portion 110 from the opened position as shown in FIG. 2. Front portion 106 is positioned at angle θ, or approximately 160°, with respect to front portion 110 and tilted as it is brought towards front portion 110 to feed the shaft 3864 of knuckle 206 into aperture 3852, as depicted by line 3866. Once aperture 3852 and the shaft 3864 are engaged, the hinge 376 is compressed to retract the prong 3814 of the cam 3802 into knuckle 210. Front portion 106 is leveled so that knuckle 210 resides between knuckles 206 and 208 and aperture 3854 aligns with the socket 3862. The hinge 376 is then released causing the prong 3814 to move through aperture 3854 and mate with the socket 3862, as depicted by lines 3868. Once engaged, the prong 3814 is locked into the socket 3862 rendering the cam 3802 stationary. Complete assembly of the hinge 376 to front portions 106 and 110 is shown in FIG. 41.

Operation of the hinge 376 will now be described primarily in conjunction with FIGS. 38–43. When the radiotelephone 100 of FIG. 1 is in the opened position shown in FIG. 2, the position of the hinge 376, as shown in FIG. 41, is defined by the axial displacement of the follower 3804 in the pocket 370 towards the cam 3802 as evidenced by the visibility of multiple coils of the spring 3806. Tips 4012 and 4014 of fingers 4008 and 4010 of the follower 3804 rest in the arc of curved segment 4205 of bearing surfaces 3818 and 3819, respectively, at points 4214 and 4216, respectively, as shown in FIG. 42.

As the radiotelephone 100 is moved from the opened position to the closed position shown in FIG. 1, the cam 3802 remains stationary, the follower 3804 moves in the pocket 370 along the axis of rotation 211, and tips 4012 and 4014 of fingers 4008 and 4010 traverse bearing surfaces 3818 and 3819, respectively. Movement to the closed position is initiated by urging front portion 106 clockwise with respect to front portion 110. This causes tips 4012 and 4014 to move from curved segment 4205 of bearing surfaces 3818 and 3819, respectively; angled surfaces 4020 and 4022 of fingers 4008 and 4010 to contact, and ride up, angled segment 4203 of bearing surfaces 3818 and 3819, respectively; and the follower 3804 to move toward the interior wall 3860 of the pocket 370 compressing the spring 3806. Angled surfaces 4020 and 4022 of fingers 4008 and 4010 ride angled segment 4203 of bearing surfaces 3818 and 3819, respectively, and the follower 3804 continues to move toward the interior wall 3860 of the pocket 370 compressing the spring 3806, until the apex of the arc of curved segment 4204 of bearing surfaces 3818 and 3819 is reached. As tips 4012 and 4014 pass the apex of the arc of curved segment 4204 of bearing surfaces 3818 and 3819, respectively, the follower begins to move toward the cam 3802 and the spring 3806 begins to decompress. As front portion 106 is brought into juxtaposition with front portion 110, tips 4012 and 4014 come to rest on bearing surfaces 3818 and 3819, respectively, at points 4210 and 4212, respectively, as shown in FIG. 42. Point 4210 is located on the arm of curved segment 4210 of bearing surface 3818 in close proximity to angled segment 4202 of bearing surface 3818. Point 4212 is located on the arm of curved segment 4210 of bearing surface 3819 in close proximity to angled segment 4202 of bearing surface 3819. At points 4210 and 4212 the spring 3806 remains partially compressed and preloaded to hold front portions 106 and 110 in juxtaposition. The asymmetry of tips 4012 and 4014 allows closer positioning of fingers 4008 and 4010 to angled segment 4202 of bearing surfaces 3818 and 3819, respectively, without increasing the opportunity for tips 4012 and 4014 to travel down the angled segment 4202 of bearing surfaces 3818 and 3819 and cause "lock up" of the hinge 376. This close positioning maximizes the angle of rotation of front portion 106 with respect to front portion 110, while maintaining a symmetrical design. The symmetrical design of fingers 4008 and 4010 of the follower 3804 and bearing surfaces 3818 and 3819 of the cam 3802 is desirable because it minimizes wear and extends the operation life of the hinge 376.

At this point, the front portion 106 is juxtaposed front portion 110 and the radiotelephone 100 is in the closed position shown in FIG. 1. The position of the hinge 376, as shown in FIG. 43, is defined by the axial displacement of the follower 3804 away the cam 3802 as evidenced by lack of visibility of the spring 3806 and close proximity of the follower 3804 to interior wall 3860 of the pocket 370.

Movement of the radiotelephone 100 from the closed position shown in FIG. 1 back to the opened position shown in FIG. 2 is accomplished by substantially reversing the aforementioned steps. In particular, as front portion 106 is rotated counterclockwise away from front portion 110, tips 4012 and 4014 move up the arm of curved segment 4202 of bearing surfaces 3818 and 3819, respectively, and the follower 3804 is forced along the axis of rotation 211 in a direction away from the cam 3802 causing the spring 3806 to compress. At the apex of the arc of curved segment 4204, tips 4012 and 4014 are maintained in contact with bearing surfaces 3818 and 3819, respectively, by the dome 4011 of the post 4006 of the follower 3804, which rides in the opened end of the can 3810 of the cam 3802. As tips 4012 and 4014 clear the arc of curved segment 4204 of bearing surfaces 3818 and 3819, respectively, angled surfaces 4020 and 4022 of fingers 4008 and 4010 come in contact with angled segment 4203 of bearing surfaces 3818 and 3819, respectively, and the spring 3806 begins to decompress. The spring 3806, while decompressing, forces the follower 3804 along the axis of rotation 211 in a direction toward the cam 3802. As the follower 3804 is forced toward the cam 3802, angled surfaces 4020 and 4022 are propelled along angled segment 4203 of bearing surfaces 3818 and 3819. This assists the counterclockwise rotation of front portion 106. The follower 3804 continues to move toward the cam 3802 until tips 4012 and 4014 come to rest in curved segment 4205 of bearing surfaces 3818 and 3819, respectively, at points 4214 and 4216, respectively.

Figure 44:
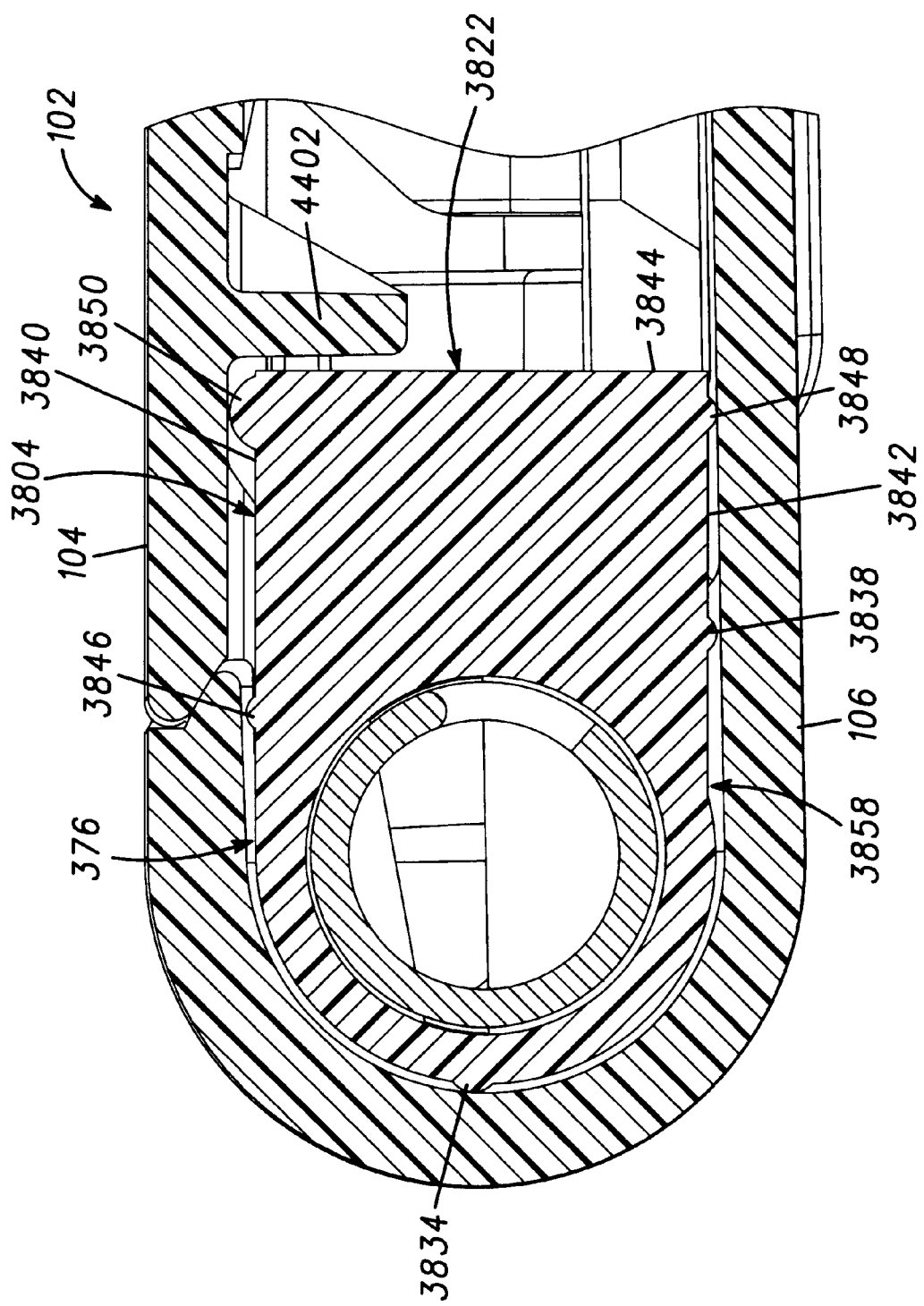
FIG. 44 is a fragmentary cross-sectional view of a top housing of the foldable device of FIG. 1 taken across the section lines 44—44 of FIG. 1.

The follower 3804 is under a relatively large force as the radiotelephone 100 is moved between the opened and closed positions. In particular, as tips 4012 and 4014 move up and over the arc of curved segment 4202 of bearing surfaces 3818 and 3819, respectively, the follower 3804 tends to want to rotate in the pocket 370 about the axis of rotation 211 of FIG. 2. Rotation of the follower 3804 would cause collisions between the follower 3804 and portions 104 and 106 of the top housing 102 sufficient to generate an audible clicking noise. Ribs 3834, 3838, 3846, 3848, and 3850 of the follower 3804 of FIGS. 38 and 40 and the uniformity of the diameter of the pocket 370, as described above, prevent such collisions and restrict movement of the follower 3804 linearly along the axis of rotation 211. In particular, ribs 3848 and 3850 on bottom and top surfaces 3842 and 3840, respectively, of the arm 3822 of the follower 3804 engage inner surfaces of back and front portions 104 and 106 of the top housing 102, as shown in FIG. 44. Ribs 3848 and 3850 prevent the follower 3804 from internally rotating about the axis of rotation 211 and generating an audible clicking noise as the radiotelephone 100 is moved between the opened and closed positions. A rib 4402 extending downward from an inner surface of back portion 104 abuts right surface 3844 of the arm 3822 to maintain alignment of the hinge 376 and guide movement of the follower 3804 along the axis of rotation 211.

While particular embodiments of the present invention have been shown, described, and preferred, modifications may be made. For example, the cam 3802 could function as the movable element while the follower 3804 operates as the stationary element. It will also be understood that the interface between the cam 3802 and the follower 3804 could alternatively consist of a mirrored cam arrangement, an asymmetrical single finger arrangement, or the like. Although shown to be incorporated into the radiotelephone 100, it will be recognized that the hinge 376 may also be beneficially used in other foldable devices, including but not limited to, pagers, laptop computers, personal digital assistants, landline telephones, cordless telephones, and the like. It is therefore intended in the appended claims to cover all such changes and modifications which fall within the true spirit and scope of the invention.

Figure 45:
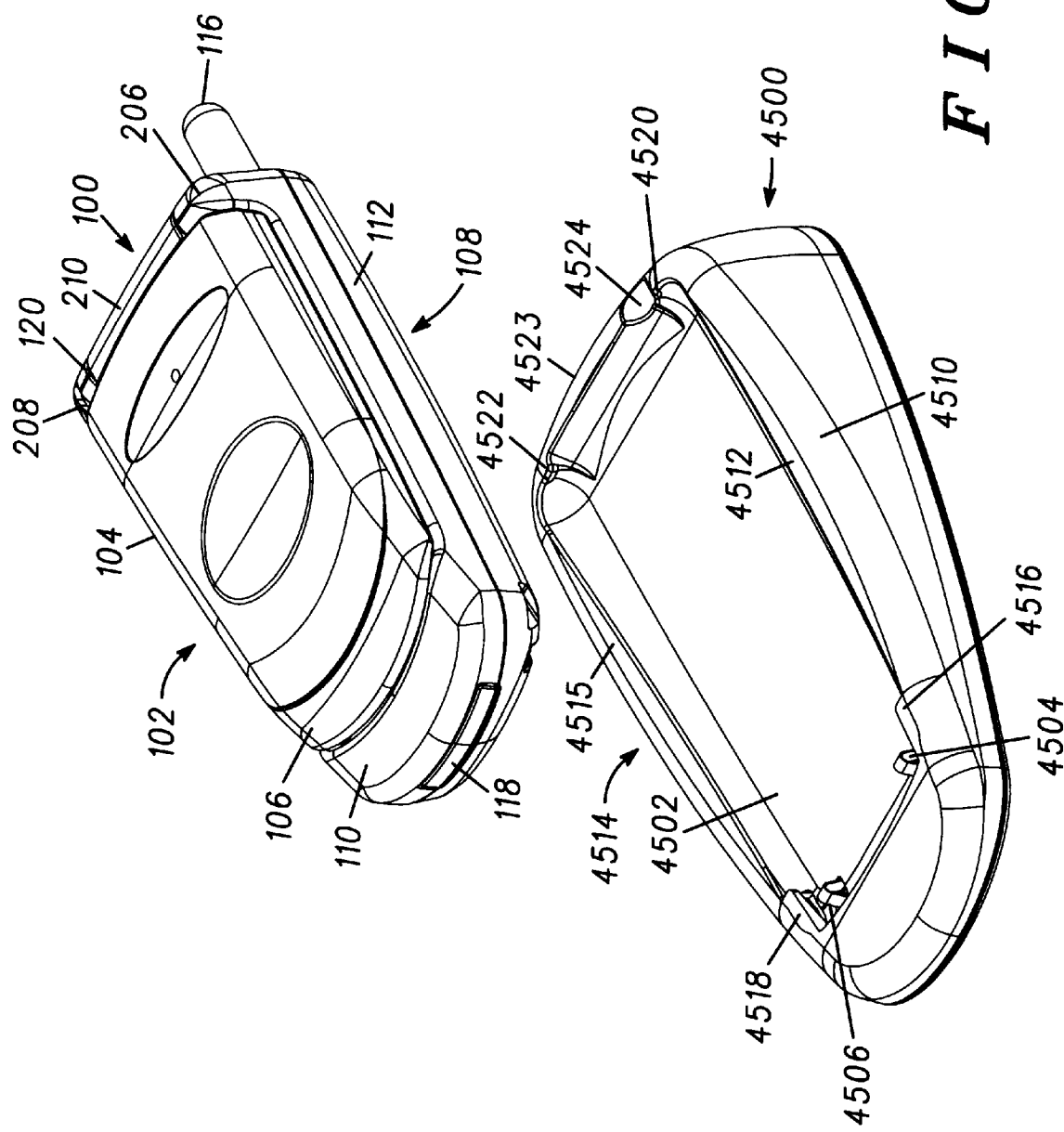
FIG. 45 is an exploded view of radiotelephone and a charging base 4500 according to the present invention.

Turning now to FIG. 45, an exploded view of radiotelephone 100 and a charging base 4500 is shown. As will be described in more detail, the novel structure of charging base 4500 enables the radiotelephone 100 to be dropped into charging base 4500, allowing gravity and the shape of the pocket to guide the radiotelephone into its proper location. The charging base preferably includes a recessed area 4502 which substantially matches the shape of the bottom housing 108 of radiotelephone 100, and is inclined at approximately 7° above horizontal, although other angles could be employed depending upon the weight of the radiotelephone, the coefficient of friction of the materials of the radiotelephone and charging base, and other factors. Charging base 4500 includes a first charging contact 4504 and a second charging contact 4506 for providing a charging current to corresponding charging contacts of radiotelephone 100. Charging base 4500 further includes a first side wall 4510 having a beveled edge 4512 and a second side wall 4514 having a similar beveled edge 4515 for guiding radiotelephone 100 into recessed area 4502. A first guide tab 4516 and a second guide tab 4518 are positioned near the lower end of the charging base to engage the corresponding guide slots of the radiotelephone. The operation of the guide tabs and guide slots will be described in more detail in reference to FIG. 49 Finally, a first rear wall portion 4520 and a second rear wall portion 4522, with a antenna recess 4524 define a recess for receiving the radiotelephone when the rear of the radiotelephone clears the rear wall portions. Although the center rear wall portion is shown slightly behind the first and second rear wall portions, a single rear wall portion extending across the back of the charger could be incorporated according to the present invention.

In operation, guide elements on the charging base are used to engage corresponding guide elements in the radiotelephone to ensure that the contacts on the radiotelephone are held against contacts on the charging base at all times. Preferably, the first guide tab and the second guide tab of the charging base couple with a first guide slot and the second guide slot respectively of the radiotelephone, forcing contacts of the radiotelephone against the first and second charging contacts when the rear of radiotelephone 100 clears the first rear wall portion 4520 and second rear wall portion 4522. When the rear of the radiotelephone falls into the charging pocket, the radiotelephone is securely positioned in the charging base as shown in FIG. 47, and the radiotelephone is not dependent upon gravity to maintain contact between the charging contacts of the radiotelephone and the charging contacts of the charging base.

The novel shape of charging base 4500 and the shape of back portion 112 of the bottom housing enables easy insertion of the radio telephone into the charging base. In particular, the rear wall portion including center rear wall portion 4523 provides an incline for the radio telephone when contoured edge 792 makes contact with recessed area 4205 and outer surface 790 makes contact with center rear wall portion 4523. Because recessed area 4205 is generally inclined, and the radio telephone when positioned on the recessed area and center rear wall portion is generally inclined, the radio telephone slides towards the guide tabs of the charging base.

In particular, because outer surface 790 and contoured edge 792 of the back portion are generally concave, radiotelephone 100 moves along recessed area at a contact point of the contoured edge. The contact point is generally less than the entire width of the contoured edge, and reduces the friction as the radio telephone slides along the recessed area. Similarly, because center rear wall portion 4523 of the charging base is slightly convex and the outer surface 790 of the radio telephone is convex, radio telephone 100 rides along center rear wall portion at a contact point of outer surface 790. Accordingly, the radio telephone generally slides along a contact point of the recessed area and a contact point of the center rear wall portion, which depend upon the amount of curvature, minimizing the amount of friction when the radiotelephone slides into the charger. Minimizing the amount of friction reduces the amount of incline of the recessed area and/or the height of the rear wall. Further, if the radio telephone is not perfectly aligned in the charger housing during insertion, the beveled edges of the side walls of the charging base help direct the radio telephone into the recessed area, while the side walls generally act to align the radio telephone within the recessed area.

As is also apparent in FIG. 47, indicator 120 is visible when the phone is in the charging base, enabling viewing of the charging status when charging. Indicator 120 is also visible when the folded radiotelephone is placed in a shirt pocket, providing a status of the phone. Indicator 120 could be, for example, a multi-color LED providing an indication of IN USE, ROAM, NO SVC, or other states which are commonly known in the wireless communications industry. As shown in FIG. 48 with the radiotelephone in the open position, indicator 120 is also visible to show a charging status of the radiotelephone. Because the light pipe is generally centered in the knuckle and follows the curvature of the hinge, indicator 120 is viewable from the front of the handset with the top housing either opened or closed.

Figure 49:
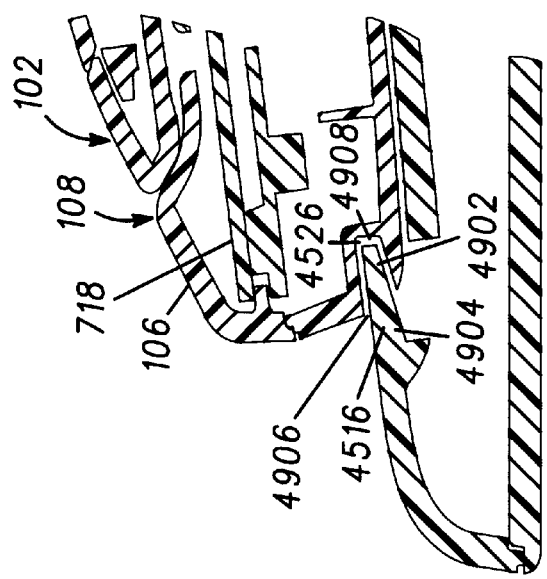
FIG. 49 is a cross-sectional view of the radiotelephone and charging base of FIG. 47 taken at lines 49—49 according to the present invention.

Turning now to FIG. 49, a cross section taken at lines 49—49 of FIG. 47 shows the coupling of first guide tab 4516 of the charging base with second guide slot 4526 of the radiotelephone. The corresponding guide tabs and guide slots are shaped to enable the coupling of the radiotelephone and the charging base. In particular, a narrow portion 4902 of first guide tab 4516 generally extends to a wide portion 4904. The corresponding second guide slot 4526 generally extends from a wide portion 4906 to a narrow portion 4908. As narrow portion 4902 of the first guide tab is advanced toward narrow portion 4908 of the second guide slot, the guide tab and the guide slot help properly orient the radiotelephone in the charging base to enable charging, as described in reference to FIG. 50.

Figure 50:
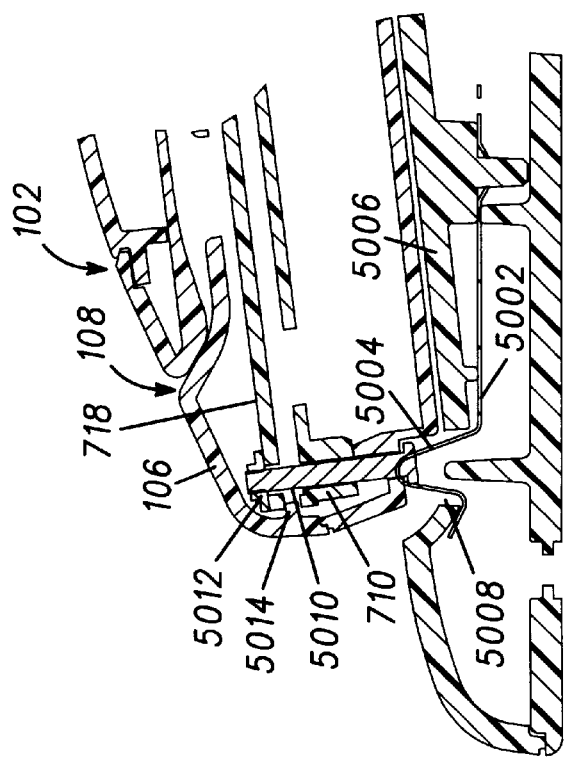
FIG. 50 is a cross-sectional view of the radiotelephone and charging base of FIG. 47 taken at lines 50—50 according to the present invention.

Turning now to FIG. 50, a cross section of FIG. 47 taken at lines 50—50 shows the charging contact arrangement according to the present invention. In particular, a charging contact 5002 has a contact portion 5004 which extends through recess wall 5006 at a contact aperture 5008. Contact portion 5004 makes contact to a contact screw 5010 to enable charging of the radiotelephone. As is apparent, the head of contract screw 5010 is exposed to allow charging by the charging base. Preferably, a board contact 5012 is soldered to logic board 718. Board contact 5012 eliminates the need for an additional charging contact by utilizing the screws that hold the phone together as a connection point for charging. The board contact also eliminates the need for a threaded insert which would normally be welded into the plastic housing and has certain height requirements. Because board contact 5012 is soldered onto the logic board, the design of the board contact is shorter than an insert, allowing for a more compact design. The logic board is assembled in front portion 106 and retained by undercuts 5014 in the front housing, allowing retention force of the screws to act on the front and rear housing.

As can be seen from the foregoing, the present invention provides a method and apparatus for routing flexible circuit conductors. The apparatus uses a reduced number of components for flex routing and for providing a pivot surface for a hinge between the two housings. A slotted bearing surface allows the flex strip to be routed between housing elements and retains the flex completely contained. Thus, the flex strip can be used without damage and without being visible.

While a particular embodiment of the present invention has been shown and described, modifications may be made. It is therefore intended in the appended claims to cover all such changes and modifications which fall within the true spirit and scope of the invention.

What is claimed is:

1. An electronic device comprising:
   a first housing defining a first hinge aperture and a slot adjacent the first hinge aperture;
   a second housing defining a second hinge aperture having an inner rotation surface, the first hinge aperture aligning with the second hinge aperture along an axis; and
   a shaft extending from the first housing at the first hinge aperture and coaxial with the axis, the shaft sized for insertion in the second hinge aperture and terminating in a bearing surface, the inner rotation surface pivoting on the bearing surface as the second housing moves in relation to the first housing, the shaft and the bearing surface both defining a shaft slot aligned with the slot in the first housing for routing a flexible circuit element between the first housing and the second housing.

2. An electronic device as recited in claim 1 wherein the first housing and the shaft are molded as a single assembly.

3. An electronic device as recited in claim 1 wherein the shaft further comprises a barrel sized for insertion in the first hinge aperture, the shaft slot extending along a side of the barrel a distance sufficient to permit insertion of the flexible circuit element through the shaft slot during assembly of the first housing and the second housing.

4. An electronic device as recited in claim 1 wherein the shaft further comprises a first set of retention features and the first hinge aperture includes a second set of corresponding retention features configured for engagement by the first set of retention features to prevent radial deformation of the shaft.

5. An electronic device as recited in claim 4 wherein the first set of retention features comprises one or more ribs disposed on an outer surface of the shaft and the second set of corresponding retention features comprises one or more grooves formed on an inner surface of the first hinge aperture, the one or more ribs engaging the one or more grooves to prevent radial deformation of the shaft.

6. An electronic device as recited in claim 5 wherein the one or more ribs abut the second housing to retain the shaft within the first hinge aperture.

7. A communication device comprising:
   a first housing containing first electronic circuitry, the first housing including a front surface and a first knuckle disposed on the front surface at one end, the front surface defining a slot;
   a shaft extending from the first knuckle along an axis, the shaft including a barrel and a bearing surface, the shaft defining a shaft slot in one side of the shaft, the shaft slot aligning with the slot;
   a second housing containing second electronic circuitry, the second housing including a second knuckle aligned with the first knuckle and the shaft for rotation about the axis, one side of the second knuckle having an open end and defining an inner rotation surface which pivotably engages the bearing surface, the second knuckle defining a second knuckle slot proximate the second electronic circuitry; and
   a flexible circuit element coupling the first electronic circuitry and the second electronic circuitry, the flexible circuit element being routed from the second housing through the second knuckle slot, through the open end of the second knuckle and through the shaft slot and the slot to the first housing.

8. A communication device as recited in claim 7 wherein the shaft further comprises an outer surface and a first set of retention features disposed on the outer surface, and wherein the first knuckle defines a first hinge aperture having an inner surface defining a second set of corresponding retention features, the first hinge aperture sized to retain the shaft, the second set of corresponding retention features engaging the first set of first set of retention features to prevent radial distortion of the shaft and pinching of the flexible circuit element.

9. A communication device as recited in claim 7 wherein the first knuckle defines a first hinge aperture coaxial with the first knuckle, the slot extending from the first hinge aperture in the front surface of the first housing, the shaft being insertable in the first hinge aperture to align the shaft slot with the slot.

10. A communication device as recited in claim 9 wherein the shaft has an outer surface and a first rib and a second rib disposed on the outer surface adjacent to and parallel to the shaft slot, and wherein the first hinge aperture has an inner surface defining a first groove and a second groove located adjacent to and parallel to the slot, the first rib engaging the first groove and the second rib engaging the second groove to prevent radial deformation of the shaft and pinching of the flexible circuit element.

11. A method for routing a flexible circuit element between movable housing elements, the method comprising the steps of:
   providing a hinge which includes a first hinge portion having a slot and a shaft, the shaft including a bore and a slotted bearing surface, and a second hinge portion defining an aperture having an inner rotation surface;
   inserting the flexible circuit element in the aperture of the second hinge portion;
   extending the flexible circuit element through the slotted bearing surface and the bore and through the slot; and
   positioning the shaft in the aperture so that the inner rotation surface engages the bearing surface.

12. A method as recited in claim 11 further comprising the steps of:
   defining a first hinge aperture in the first hinge portion, the first hinge aperture adjacent the slot; and
   inserting the shaft into the first hinge aperture so that a slot of the slotted bearing surface aligns with the slot.

13. A method as recited in claim 12 further comprising the steps of:

providing retention features on an outer surface of the shaft adjacent the slot of the slotted bearing surface;

providing corresponding retention features on an inner surface of the first hinge aperture adjacent the slot; and aligning the retention features and the corresponding retention features when inserting the shaft in the bore.

14. A hinge integrally associated with movable housing portions of a wireless communication device for routing a flexible circuit element between the movable housing portions, the hinge comprising:

a first housing portion including a first knuckle having a first side wall defining a first hinge aperture, the first hinge portion defining a slot adjacent the knuckle;

a shaft extending from the first knuckle along an axis, the shaft including a shaft side wall defining a hollow bore and a shaft slot in the shaft side wall and a bearing surface;

a second housing portion having a second side wall defining a second hinge aperture and a second slot; and a flexible circuit element having a first portion extending through the second slot to the second hinge aperture and a second portion extending through the shaft slot to the hollow bore and into the slot.

15. A hinge as recited in claim 14 wherein the second housing portion comprises a second knuckle which aligns with the first knuckle along the axis, the movable housing elements rotating about the axis between a first position and a second position.

16. A hinge as recited in claim 15 wherein the first housing portion further comprises a third knuckle aligned on the axis, the second knuckle being retained between the first knuckle and the third knuckle.

17. A hinge as recited in claim 15 wherein the second side wall comprises an inner rotation surface which pivots upon the bearing surface when the shaft is inserted in the second hinge aperture.

18. A hinge as recited in claim 14 wherein the shaft and the first knuckle are integrally formed as a single element.

19. A hinge as recited in claim 14 wherein the shaft and the first knuckle are formed as individual elements and the shaft is sized for insertion in the first hinge aperture.

20. A hinge as recited in claim 19 wherein the shaft side wall comprises retention features adjacent the shaft slot and the first side wall has an inner surface defining corresponding retention features adjacent the slot, the retention features engaging the corresponding retention features when the shaft is inserted in the first hinge aperture.

21. A hinge as recited as claim 19 wherein retention features and the corresponding retention features maintain a predetermined slot width at the slot to prevent pinching of the flexible circuit element at the slot.

* * * * *